United States Patent [19]
Kerber

[11] Patent Number: 5,612,659
[45] Date of Patent: Mar. 18, 1997

[54] BATTERY PROTECTING CIRCUIT BREAKER

[75] Inventor: Nick M. Kerber, Tigard, Oreg.

[73] Assignee: Quicksilver Engineering, Roseburg, Oreg.

[21] Appl. No.: 287,076

[22] Filed: Aug. 8, 1994

[51] Int. Cl.$^6$ ......................................................... H01H 9/00
[52] U.S. Cl. .......................... 335/177; 335/78; 307/10.7; 320/45
[58] Field of Search ................................ 335/78–86, 124, 335/128, 177–179, 185–190; 307/10, 7; 320/45

[56] References Cited

U.S. PATENT DOCUMENTS

| | | |
|---|---|---|
| 453,572 | 6/1891 | Baumann . |
| 1,140,491 | 5/1915 | Anderson . |
| 1,485,750 | 5/1921 | Wolfe . |
| 1,980,458 | 8/1931 | Westerfelhaus . |
| 2,051,514 | 8/1936 | Block . |
| 2,081,618 | 5/1937 | Dunn . |
| 2,485,727 | 10/1949 | Gallina . |
| 2,959,717 | 11/1960 | Conger . |
| 3,321,754 | 5/1967 | Grimm . |
| 3,395,288 | 7/1968 | Von Brimer . |
| 3,474,296 | 10/1969 | Rickey . |
| 3,623,131 | 11/1971 | Russell . |
| 3,646,354 | 2/1972 | Von Brimer . |
| 3,648,145 | 3/1972 | Meyer . |
| 3,649,938 | 3/1972 | Zander et al. ........................ 335/177 |
| 4,005,344 | 1/1977 | Gaind . |
| 4,149,093 | 4/1979 | D'Alessio . |
| 4,310,817 | 1/1982 | McNeil ................................ 335/13 |
| 4,628,289 | 12/1986 | Huber . |
| 4,782,240 | 11/1988 | Davidson . |
| 4,798,968 | 1/1989 | Deem . |
| 4,855,699 | 8/1989 | Hoegh ................................ 335/181 |
| 4,902,956 | 2/1990 | Sloan . |
| 5,089,796 | 2/1992 | Glennon et al. ................... 335/172 |
| 5,241,288 | 8/1993 | Aria .................................... 335/177 |

*Primary Examiner*—Lincoln Donovan

[57] ABSTRACT

A latching circuit breaker is provided that is small and switches with a small amount of current. A battery switch incorporating the circuit breaker mounts on a battery top and is easily added as an accessory to control all of a battery's power. A convenient battery protection device uses the battery switch and a control system to automatically control a battery, prevent overdischarge, and reserve starting power. A manually resetting battery protection device is also provided. The battery protection device is adaptable to be incorporated into the design of a battery resulting in a trouble free, long-life battery.

22 Claims, 10 Drawing Sheets

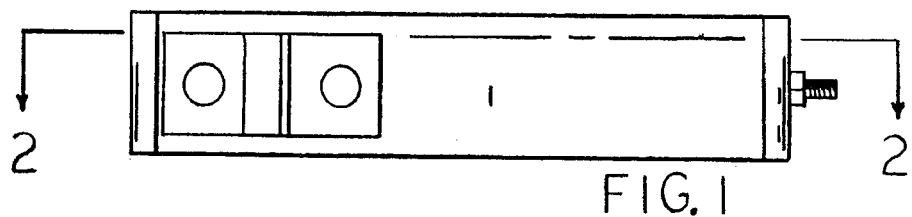
FIG. 1
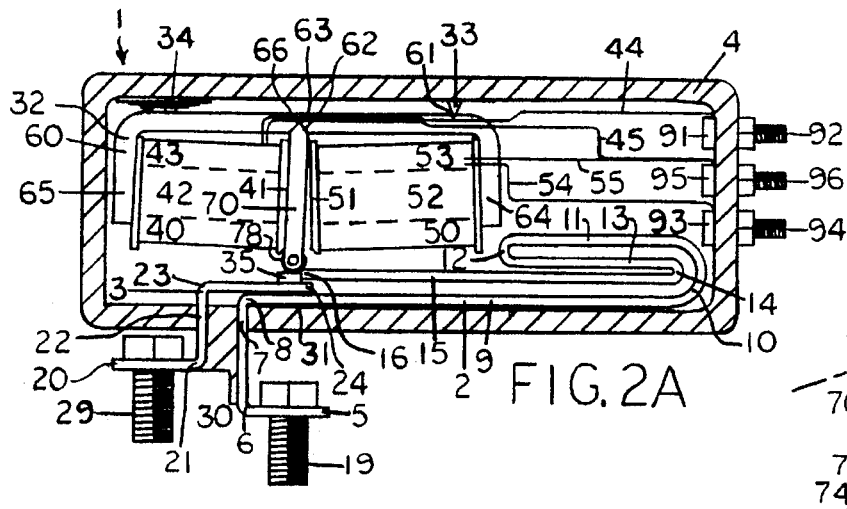
FIG. 2A
FIG. 2B
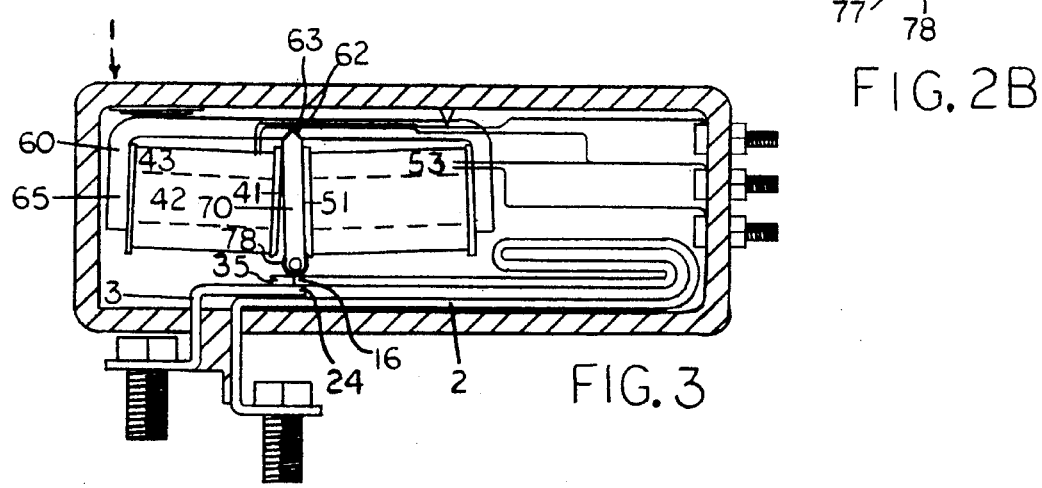
FIG. 3
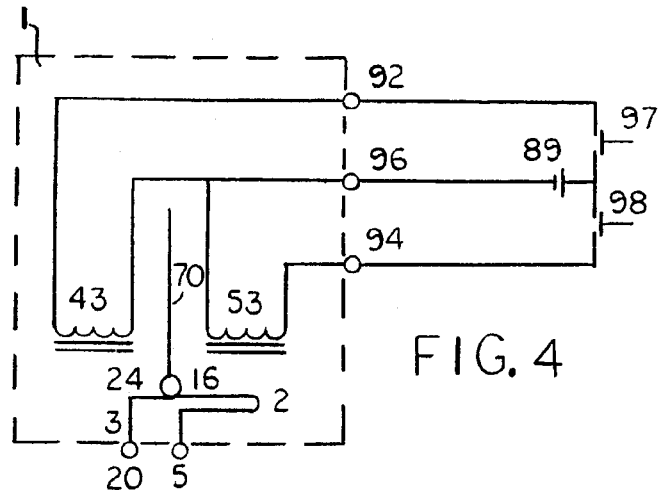
FIG. 4

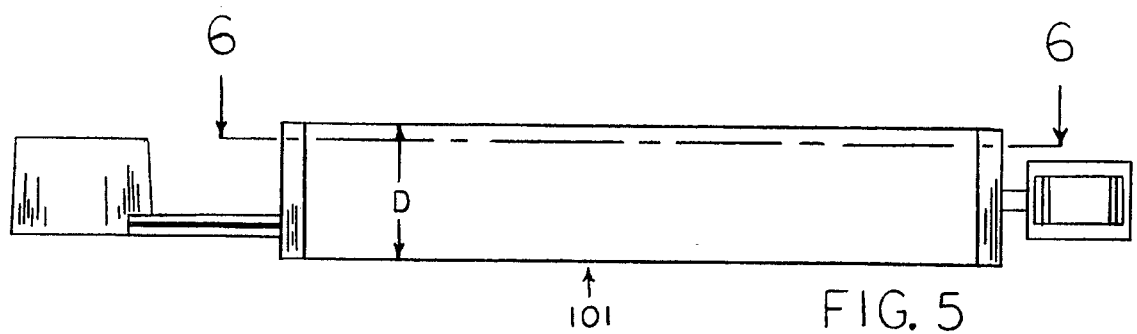
FIG. 5
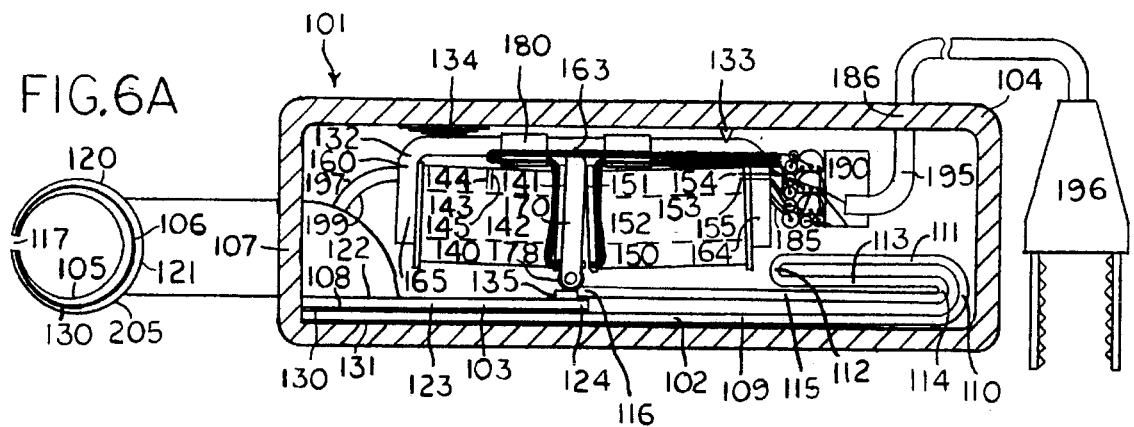
FIG. 6A
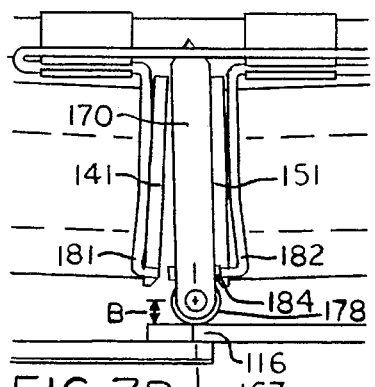
FIG. 6B
FIG. 7B
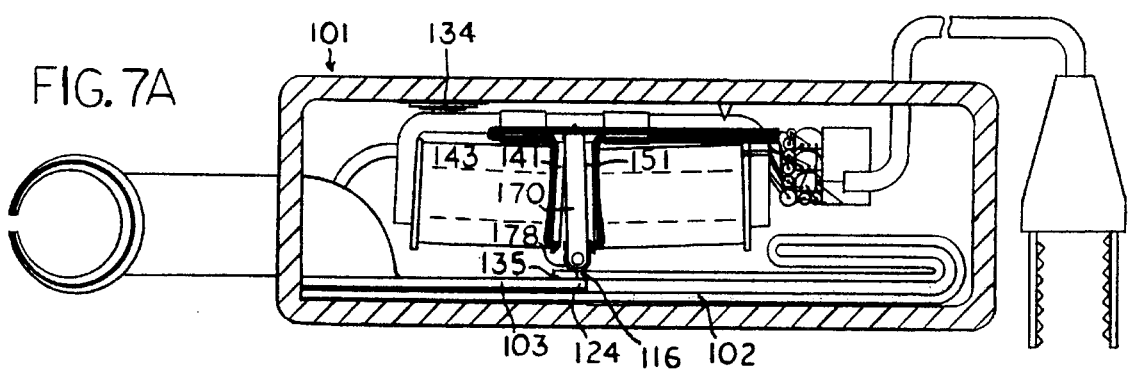
FIG. 7A

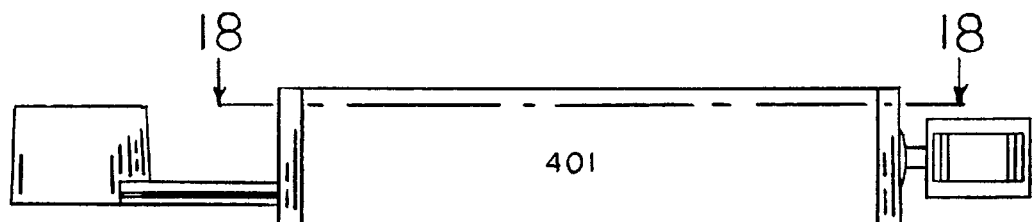
FIG.17
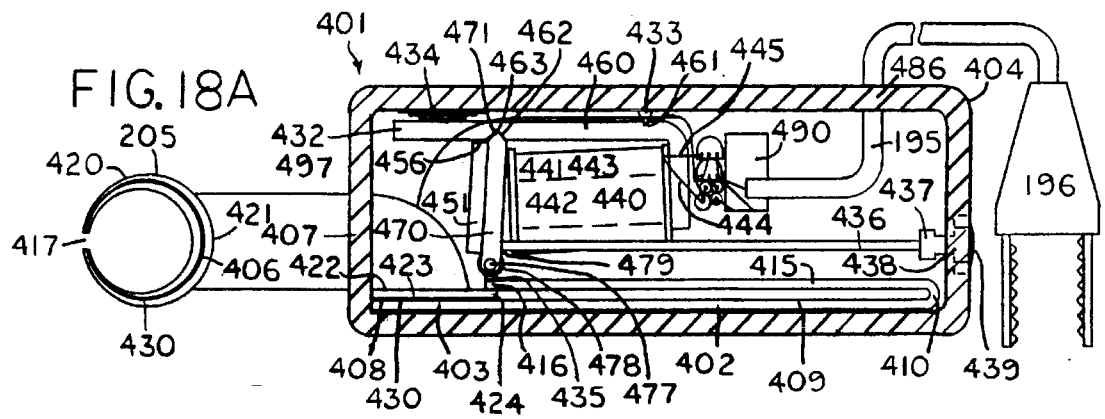
FIG.18A
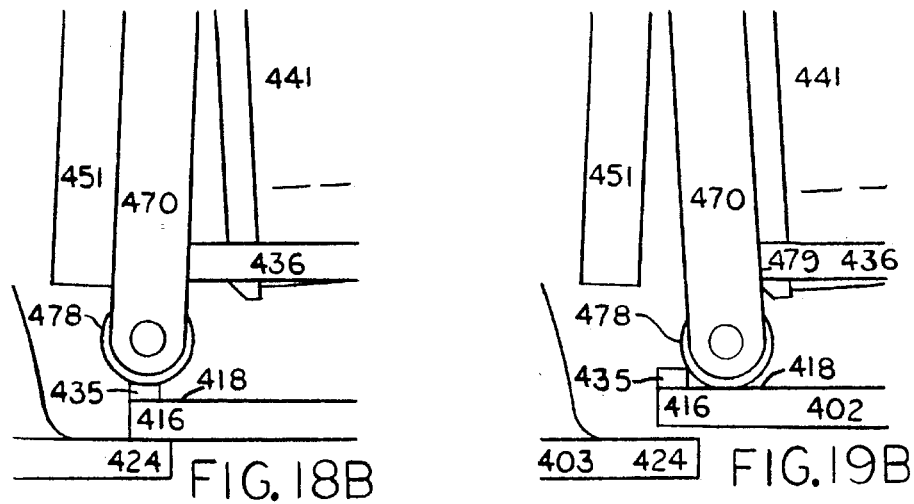
FIG.18B
FIG.19B
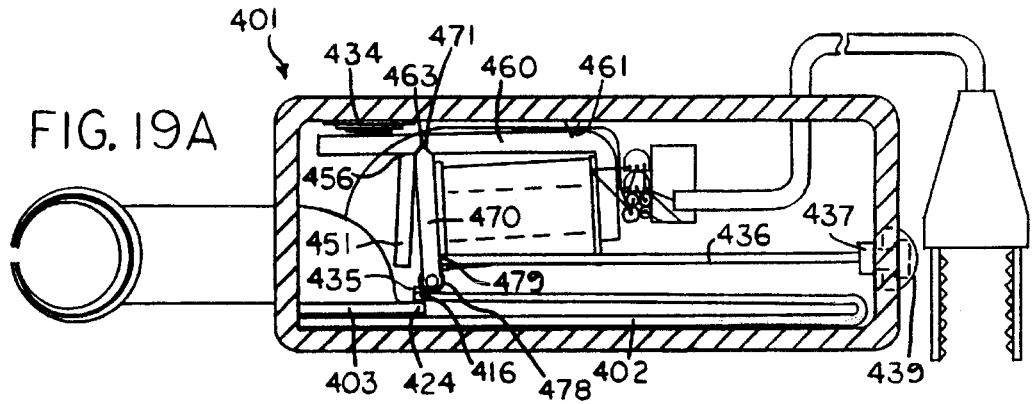
FIG.19A

BATTERY PROTECTING CIRCUIT BREAKER

BACKGROUND OF THE INVENTION

I. Field of the Invention

This invention relates generally to electrically controlled devices for making and breaking electrical circuits with a latching means and more particularly to devices for automatically preventing the exhaustion of electrical storage batteries mounted on or installed in the battery.

II. Battery Behavior

In most types of rechargeable batteries, a decrease in energy level is accompanied by a decrease in voltage. A battery also has a minimum energy level below which it loses its storage capacity and power.

When lead-acid batteries, such as those used in automotive electrical systems, are overdischarged, voltage drops sharply and if allowed to remain in this state, changes occur which irreversibly reduce the power capacity of the battery. These changes include lead dropping off the battery plates and the plates sulfating and warping.

A number of common problems cause overdischarging in vehicles. These problems include leaving accessories on, short circuits, corrosion leakage, faulty wiring, and charging system failures.

The increasing complexity of electrical and electronic systems has contributed to the frequency of failures. Lead-acid battery failures from overdischarge are common. The average life of a battery is only abut 3 years. Over 120 million replacement batteries are sold every year. Sadly, failed batteries cause grief, are inconvenient, expensive to replace, and a danger to the environment.

Fortunately, if discharge is stopped at a minimum voltage level, the battery will equalize chemically, increase in voltage, and regain its ability to deliver substantial power. For a 12 volt, lead-acid battery the minimum voltage level is abut 11.0 volts.

Overdischarge and voltage drop in banks of nickel-cadmium batteries in series can completely discharge a single cell and impose a reverse voltage on it, damaging the cell's power capacity.

III. Description of Prior Art A. Latching Circuit Breakers

Previous electrically controlled, latching, circuit breaker-makers U.S. Pat. Nos. 453,572 by Baumann, 1,140,491 by Anderson, 1,485,750 by Wolfe, 1,980,458 by Westerfelhaus, 2,081,618 by Dunn, and 4,628,289 by Huber have employed physically large electromagnetic coils and mechanisms in relation to their current carrying capacity, and relatively complex mechanisms.

B. Battery Mounted Circuit Breakers

U.S. Pat. No. 4,310,817 by McNeil, is an electrically controlled circuit breaker that mounts on a battery post. It is added as a battery accessory without changing the existing electrical wiring. Although the device is adequate to perform this function, its physical dimensions are large so as to interfere with other equipment such as close fitting vehicle hoods and accessory equipment. Other shortcomings are its relatively large actuating current, the need to be manually reset, and its relatively large cost to manufacture.

U.S. Pat. Nos. 4,782,240 by Davidson and 4,798,968 by Deem are circuit breakers mounted on a battery post controlled by means other than a controllable electrical signal. Both require connection of the load to a nut and bolt terminal which most often requires alteration of existing connectors. The Davidson design connects to the battery terminal by way of a metal plate with a hole through it and lacks resistance to vibration. The Deem device breaks circuits when there is an external impact, and although meant to be mounted in battery space, it is so large as robe interfered with by the position of ventilation caps found on some common battery designs and by accessories above the battery such as tight fitting compartment hoods.

C. Automatically Controlled Circuit Breakers

A number of patents use automatically controlled circuit breakers to prevent overdischarge of a battery.

A common shortcoming of these designs is they are not easily transferred from one electrical system to another. Installing them to protect an existing electrical system requires alteration of wiring and ample space for physical mounting. This makes it expensive and awkward to add them to battery systems such as vehicle electrical systems.

U.S. Pat. No. 4,149,093 by D'Alessio uses a complex control circuit and a special circuit breaking mechanism to switch a vehicle battery. Shortcoming of the device include the manufacture of a relatively expensive device and the inconvenience of manually resetting the mechanism.

One shortcoming of the remaining designs for use in vehicles, is they do not control power to the starter motor. If an electrical leak or short circuit occurs in this branch circuit, overdischarge can damage the battery.

U.S. Pat. No. 4,902,956 by Sloan uses a complex circuit with a microprocessor and a conventional solenoid to control accessory circuits. Its shortcomings include the manufacture of a relatively expensive device and the inconvenience of manually resetting a mechanism.

The remaining prior art cited of automatically controlled circuit breakers are electrical and electronic circuit designs. They monitor battery voltage and use a voltage sensitive means to open a connecting relay when voltage drops below a certain value, breaking the circuit.

In these designs the circuit breaker is reset by either manually manipulating a switch, or automatically with a relay energized by a voltage sensitive circuit. The manually resetting designs are either inconvenient to reset or require extra wiring. The automatically resetting designs have the shortcoming of cycling on and off after they break the circuit. As an example, consider the case of an automobile when the headlights are left on. The battery discharges to its shut-off voltage level and the circuit breaker opens, interrupting power to the headlights. With no load on the battery, battery voltage spontaneously increases to an upper turn-on voltage level and the circuit breaker recloses, supplying electricity to the headlights or other drains. Once more the battery discharges to its lower shut-off voltage and this on-off cycling repeats. This causes further deterioration of the battery until the load is removed or the battery recharged.

Another shortcoming of the following designs is that they use relays that are not self-latching and require holding current to keep relay contacts closed during normal operation. This is a costly energy drain on the power source, as it drains the battery, especially over long periods of time.

U.S. Pat. Nos. 2,051,514 by Block, 2,485,727 by Gallina, 3,395,288 by Von Brimer, and 3,623,131 by Russel use voltage sensitive relay switches to control electric power.

A number of patent designs replace the voltage sensitive relay with sensing elements and a less expensive conventional relay to save costs and improve switching voltage accuracy.

U.S. Pat. Nos. 3,474,296 by Rickey, and 3,395,288 by Vone Brimer use a zener diode and a relay to replace the voltage sensitive relay.

U.S. Pat. Nos. 3,646,354 by Von Brimer, and 4,005,344 by Gaind use a transistor and relay to control the circuit.

U.S. Pat. Nos. 3,648,145 by Meyer, and 2,959,717 by Conger use a zener diode, transistor and relay to control the circuit.

D. Similar Electronic Designs

U.S. Pat. No. 3,321,754 by Grimm uses zener diodes, transistors, and relays to provide undervoltage and overvoltage indicators. The main shortcoming to our application is that it performs no circuit breaking function.

SUMMARY OF THE INVENTION

To avoid the limitations and problems with present relays, battery protecting devices, battery controllers, and batteries, this invention provides novel mechanisms, mounting means, and electronic control circuits.

The preferred embodiment of the invention provides an electrically controlled, latching, electromechanical circuit breaker that switches requiring a small amount of electrical energy and a small amount of current in relation to its current carrying capacity, while remaining relatively small in size, simple in design, and inexpensive to manufacture.

Another aspect of the preferred embodiment is to provide a sealed, battery protecting device with a latching switch unit that controls all of the battery's power, switches requiring a small amount of electrical energy and a small amount of current in relation to its current carrying capacity with a small, automatic control system for the switch that protects a battery from overdischarge, reserves substantial battery power, allows large current drains of short duration, avoids further power loss, consumes very little power, with a means of connection to the battery and battery cable allowing a range of orientations for the device and the battery cable, can be easily added or removed as an accessory to an electrical system without modification of wiring, has sufficiently small physical dimensions so as to fit on top of the battery within the confines of normal battery dimensions without obstructing nearby equipment such as close fitting vehicle hoods and accessories, in 2 forms; either automatically or manually resetting, and is simple and inexpensive to manufacture.

Another aspect of the preferred embodiment is to provide a sealed battery switch that switches all of a battery's power with a small, brief electrical current, latches requiring no holding current, with a means of connection to the battery and battery cable allowing a range of orientations for the device and the battery cable, can be easily added or removed as an accessory to an existing electrical system without modification of wiring, has sufficiently small physical dimensions so as to fit on top the battery within the confines of normal battery dimensions without obstructing nearby equipment, and is simple and inexpensive to manufacture.

Another aspect of the preferred embodiment is to provide a battery with a built-in switch and control system that switches all of the battery's power with a small amount of energy and current, that automatically protects the battery from overdischarge, reserves substantial power, consumes very little power, in 2 forms; either automatically or manually resetting, and is simple and inexpensive to manufacture.

These and other aspects of the preferred embodiment are variously provided by novel contact actuators, formed conductor, terminal adaptor, load sensor, battery housing, conductor connection, and electronic control systems.

One aspect of the present invention is provided by a circuit breaker for switching an external electrical circuit means having a current path. The circuit breaker includes a frame and an armature mounted relative to the frame. The armature has an edge and is movable for moving the edge between a first position and a second position spaced from the first position. A device, such as a solenoid, is operable for moving the armature edge from the first position to the second position. A pair of electrical circuit contacts are mounted adjacent to the edge of the armature and are connectable to the external electrical circuit. The pair of contacts includes a fixed-position contact and a movable contact. The movable contact is movable between contacting and noncontacting positions for opening and closing the external current path.

A roller is mounted on the armature edge for rolling along a roll surface when the armature edge moves between the first and second positions. The roll surface includes a movable surface that moves relative to the fixed-position contact a distance less than the radius of the roller as the roller rolls along the roll surface. The contacts move between the contacting position and the noncontacting position when the roller means rolls relative to the movable surface.

In the preferred embodiment of the invention, the circuit breaker is used for selectively disconnecting a battery having terminals providing a voltage differential from and reconnecting the battery to the external electrical circuit. There are first and second coaxial and spaced-apart solenoids mounted relative to the frame which are selectively and independently operable for generating a magnetic field between the first and second solenoids. The armature extends between the first and second solenoids and has a pivot end for pivoting relative to the frame between a first position adjacent to the first solenoid and a second position adjacent to the second solenoid in response to the respective operation of the first and second solenoids. The armature also has a roller end opposite from the pivot end.

First and second electrical conductors connectable to the external current path terminate in the respective movable and nonmovable contacts adjacent to the roller end of the armature. The first conductor has shape memory and is biased relative to the second contact. The roller is mounted on the armature roller end for movement with the roller end and rolls along a length of the movable conductor surface. The roller moves the movable conductor against the bias of the movable conductor.

A spring between the frame and a housing encasing the circuit breaker resiliently biases the roller toward the contacts. The armature has a center position between the first and second positions at which there is a maximum bias on the roller, whereby the armature is self-latching in the first and second positions.

A control circuit is responsive to the voltage differential between the battery terminals for selectively operating the first and second solenoids. This circuit includes a sensor for sensing the voltage differential between the first and second terminals. The second solenoid is operated when the armature is in the first position and the sensed voltage is below a first selected voltage. The first solenoid is operated when the armature is in the second position and the sensed voltage is above a second selected voltage. The control circuit further includes a circuit for delaying the operation of the second solenoid to a time after the time the sensed voltage is below the first selected voltage. Sensors also sense when the armature has moved to a respective one of the first and second positions while the respective one of the first and second solenoids is operating. Operation of the respective one solenoid ceases when the armature is in the sensed one position.

In yet another aspect of the invention, a terminal adapter is provided for inserting an electrical circuit element, such as the circuit breaker of the invention, in series between a battery terminal post and a battery connector adapted for connection to the battery terminal post. The terminal post extends with a known shape outwardly from a surface of the battery, such as is the case with a conventional vehicle battery. An electrically conductive inner collar is adapted to be electrically coupled to the electrical circuit element and intimately received on the terminal post. An electrically conductive outer collar generally surrounds the inner collar and also is adapted to be electrically coupled to the electrical circuit element. An insulator insulates the inner collar from the outer collar. A device is used for connecting the outer collar to the battery connector.

A long-life electrolytic battery made according to the invention includes a housing having a plurality of planar faces and at least one electrolytic cell defined by associated walls and containing an electrolytic solution. Oppositely spaced positive and negative electrodes extend into the electrolytic solution. Associated respective positive and negative terminal posts extend from a face of the housing.

A cavity is formed in the housing and extends inwardly of a face of the housing between a pair of adjacent cell walls. A lid is sealingly placeable over the cavity to form a continuation of the face in which the cavity is formed. A circuit breaker is mounted in the cavity for connecting one of the terminal posts to the associated one of the electrodes, and for disconnecting the one terminal post from the one electrode when the voltage between the positive and negative electrodes is less than a selected voltage. A mechanism connects the circuit breaker between the one terminal post and the one electrode.

The connecting mechanism preferably includes a first planar conductor that is connected to the circuit breaker. A second planar conductor is connected to the circuit breaker. An electrically insulating membrane separates the two conductors. A fastener secures together in an ordered assembly the positive terminal, the first conductor, the membrane, the second conductor, and the positive electrode, with the one terminal and the first conductor electrically connected, with the second conductor and the one electrode electrically connected, and with the first and second conductors electrically isolated.

Still other aspects and advantages of the preferred embodiment will in part be obvious and will in part be apparent from the specification and drawings.

The invention is embodied in the features of construction, combination of elements, and arrangements of parts which will be exemplified in the constructions hereinafter set forth, and the scope of the invention will be indicated in the claims.

BRIEF DESCRIPTION OF THE DRAWINGS

FIG. 1 is a side elevation view of the first preferred embodiment.

FIG. 2A is a sectional view of FIG. 1 taken along line 2—2 showing the switching device in the opened position.

FIG. 2B is a perspective view of the armature of FIG. 2A.

FIG. 3 is the sectional view of FIG. 2A showing the switching device in the closed position.

FIG. 4 is a schematic drawing of the control circuit for the first preferred embodiment.

FIG. 5 is a side elevation view of the switching device of the second preferred embodiment.

FIG. 6A is a sectional view of FIG. 5 taken along line 6—6 showing the switching device in the opened position.

FIG. 6B is an expanded view of the proximity assembly of FIG. 6A in the opened position.

FIG. 7A is the sectional view of FIG. 6A showing the switching device in the closed position.

FIG. 7B is the expanded view of the proximity assembly of FIG. 7A in the closed position.

FIG. 17 is a side elevation view of the switching device of the third preferred embodiment.

FIG. 18 is a sectional view of FIG. 17 taken along line 18—18 showing the switching device in the closed position.

FIG. 18B is an expanded view of the armature of FIG. 18A in the closed position.

FIG. 19A is the sectional view of FIG. 18A with the switching device in the opened position.

FIG. 19B is an expanded view of the armature of FIG. 19A in the opened position.

DESCRIPTION OF THE PREFERRED EMBODIMENTS

Figure 8:
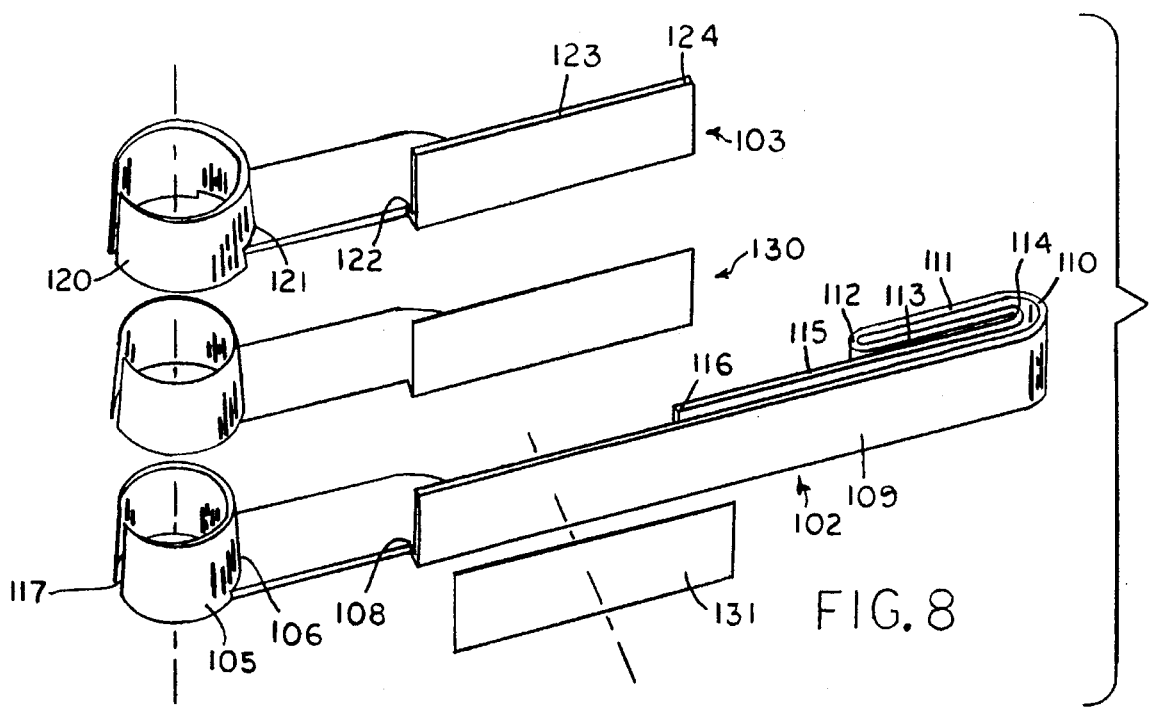
FIG. 8 is a perspective, exploded view of the conductor assembly of the second preferred embodiment.

I The First Preferred Embodiment- an efficient relay

In the first preferred embodiment, referring to FIG. 2A, an electrical switching device 1, includes a movable conductor 2 and a fixed conductor 3, both made of an electrically conducting material preferably of copper but not limited to other materials, and a hermetically sealed housing 4. Movable conductor 2 is a rectangular bar that begins at movable terminal end 5, is bent at a first 90° bend 6, passes through housing 4 at passage 7, to a second 90° bend 8, to a straight length 9, a first 180° circular arc 10, a straight length 11, a second 180° circular arc 12, a straight length 13, a third 180° circular arc 14, a straight length 15, and ends in movable contact 16. The shape can be economically formed from sheet metal. The folded section, including first arc 10, straight length 11, second arc 12, straight length 13, and third arc 14, allows movable conductor 2 to act as a cantilever spring with reduced stiffness to force at the movable contact 16 end while remaining relatively short in length. Conductor 2 thus provides means for biasing movable contact 16. Fixed conductor 3 begins at fixed terminal end 20, is bent at a first 90° bend 21, passes through housing 4 at passage 22, to second 90° bend 23, and ends in fixed contact 24. Fixed conductor 3 is covered with a thin, electrically insulating film 30 on its bottom side between fixed conductor 3 and movable conductor 2, providing electrical separation between them along these surfaces. Spacer 31 is glued to housing 4 and provides a small clearance between housing 4 and movable conductor 2 along straight length 9. Movable conductor 2 and fixed conductor 3 are secured to housing 4 by hermetic seals at passage 7 and passage 22. The unrestrained position of movable contact 16 is a small distance above and out of contact with fixed contact 24.

Also included in the switching device 1 is a dual solenoid assembly 32, a triangular bar shaped pivot 33, helical spring 34, and block 35. Block 35 is made of an electrically insulating material and is the same thickness as movable contact 16. Dual solenoid assembly 32 consists of an opening solenoid 40, a closing solenoid 50, a magnetically conducting body 60, a magnetically conducting armature 70, and roller 78. Solenoids 40 and 50 are means for moving armature 70. Opening solenoid 40 includes a magnetically conducting opening solenoid core 42, a magnetically conducting opening solenoid face 41, and opening coil 43. Opening solenoid core 42 is fastened to body 60 at body opening end 65. Opening coil wire 44, and opening coil ground wire 45 are the 2 ends of opening coil 43. Closing solenoid 50 includes a magnetically conducting closing solenoid core 52, a magnetically conducting closing solenoid face 51, and closing coil 53. Closing solenoid core 52 is fastened to body 60 at body closing end 64. Closing coil wire 54, and closing coil ground wire 55 are the 2 ends of closing coil 53. Opening coil wire 44 is connected to opening control stud 91 which passes through housing 4 and ends in opening control terminal 92. Closing coil wire 54 is connected to closing control stud 93 which passes through housing 4 and ends in closing control terminal 94. Opening coil ground wire 45 and closing coil ground wire 55 are connected to ground stud 95 which passes through housing 4 and ends in ground terminal 96. Studs 91, 93, and 95 are hermetically sealed to the housing 4.

Referring to FIGS. 2B and 2A, the pivot end 71 of armature 70 is beveled to fit in the slightly larger angle of pivot slot 62 in body 60, for allowing armature 70 to pivot about a pivot axis 66. Upper ear 72 with upper hole 74 extends down from roller end or edge 79 of main body 76 on the upper face of armature 70. An identical lower ear 73 and lower hole 75 extend down from the lower face of armature 70, parallel to upper ear 72. The ends of axle 77 of roller 78 fit into hole 74 and hole 75. Bolt 19 and bolt 29 provide a means of connecting movable conductor 2 and fixed conductor 3 to external conductors.

Referring to FIG. 2A, the dual solenoid assembly 32 is supported at one end by pivot 33 which fits into a small pivot slot 61 in solenoid body 60, also referred to as a frame, and rests against housing 4. The other end of dual solenoid assembly 32 is forced downward by spring 34, also referred to as a biasing means, on body 60, which forces armature 70 downward against roller 78, and roller 78 downward against block 35. In the position shown in FIG. 2A, this strong downward force on armature 70 is at an angle slightly less than 90° to the top face of block 35, locking armature 70 with a biasing force to the left against opening solenoid face 41. Similarly, when armature 70 is in the position shown in FIG. 3, this strong downward force on armature 70 is at an angle slightly less than 90° to the top face of movable contact 16, locking armature 70 with a biasing force to the right against closing solenoid face 51. This provides armature 70 with 2 latching positions, resistant to external forces and vibration.

Armature 70 is at an angle of 90° to the face of contact at a control position between the two latching positions at which spring 34 exerts a maximum force. The respective top faces of block 35 and conductor 2, which terminates as contact 16, also comprise a roll surface for roller 78. The top face of contact 16 is also referred to as a movable surface which moves a distance A that is less than the radius B of the roller. By making the distance the conductor moves less than the roller radius no ramp surface on the conductor is required to get a lateral force on the conductor by the roller. Also, the roller does not have to move very far to make and break the associated circuit.

FIG. 2A shows switching device 1 in its opened electrical position. Referring to FIG. 2A, when closing coil 53 is energized, a magnetic field is created along the long axis of closing solenoid core 52, setting up a magnetic circuit from closing solenoid core 52, to body closing end 64, through solenoid body 60, to pivot slot 62, and into armature 70, attracting armature 70 to closing solenoid face 51. This force overcomes the biasing force on armature 70 against opening solenoid face 41, and forces armature 70 and roller 78 to the right, pivoting about armature pivot point 63. Referring to FIG. 3, roller 78 at the end of armature 70 rolls to the right off of block 35 and onto movable contact 16, and forces movable contact 16 down into contact with fixed contact 24. Armature 70 continues to move to the right against closing solenoid face 51, where the downward force on armature 70 causes armature 70 to lock with a biasing force to the right against closing solenoid face 51. Movable contact 16 has made contact with fixed contact 24, providing an electrical pathway between movable conductor 2 and fixed conductor 3. FIG. 3 shows switching device 1 in its closed electrical position.

Referring to FIG. 3, when opening coil 43 is energized, a magnetic field is created along the long axis of opening solenoid core 42, setting up a magnetic circuit from opening solenoid core 42, to body opening end 65, through solenoid body 60, to pivot slot 62, and into armature 70, attracting armature 70 to opening solenoid face 41. This force overcomes the biasing force on armature 70 against closing solenoid face 51, and forces armature 70 and roller 78 to the left, pivoting about pivot axis 66 defined by armature pivot point 63. Referring to FIG. 2A, roller 78 at the end of armature 70 rolls to the left, off movable contact 16 and onto block 35, and allows movable contact 16 to move upward the distance A to its unrestrained position, out of contact with fixed contact M. Armature 70 continues to move to the left against opening solenoid face 41, -Where the downward force on armature 70 causes armature 70 to lock with a biasing force to the left against opening solenoid face 41 as shown. Movable contact 16 has broken contact with fixed contact 24, breaking the electrical pathway between movable conductor 2 and fixed conductor 3. Switching device 1 is in its opened electrical position.

An advantage of this arrangement is that the movable contact 16 and the fixed contact 24 can be brought into and out of contact with each other with a momentary voltage which energizes either opening coil 43 or closing coil 53. Furthermore, once movable contact 16 and fixed contact 24 are either in or out of contact with each other, the biasing force on the armature 70 locks them into position without any more energizing current. The device acts as a small, efficient, latching, electrical relay.

Opening coil 43 and closing coil 53 are energized by connecting them briefly to a voltage source. Referring to the electrical schematic in FIG. 4, when momentary switch 97 is closed briefly, voltage source 89 is connected briefly between opening control terminal 92 and ground terminal 96, energizing opening coil 43, and causing armature 70 to move to the left off movable contact 16, which moves upward and out of contact with fixed contact 24, breaking the pathway between movable terminal end 5 and fixed terminal end 20. When momentary switch 98 is closed briefly, voltage source 89 is connected briefly between closing control terminal 94 and 9round terminal 96, energizing closing coil 53, and causing armature 70 to move to the right onto movable contact 16, which moves downward into contact with the fixed contact 24, making a pathway between movable terminal end 5 and fixed terminal end 20. The small momentary current supplied by voltage source 89 can open or close the electrical pathway between the relatively large conductors of movable conductor 2 and fixed conductor 3. Switch 97, switch 98, and voltage source 89 may be placed conveniently at a distance from switching device 1. Switch 97 and switch 98 may be any type of momentary switch, including either a manual push button switch or a programmable computer switch.

Referring to FIGS. 2A and 3, the geometry of movable conductor 2 provides a relatively large conductor with a movable contact that can be easily moved in and out of contact with fixed conductor 3 with a relatively small force while being contained in a small space. The geometry and arrangement of roller 78 and movable conductor 2 allows roller 78 to move movable contact 16 with only a short movement of roller 78 and with very little energy loss. The short movement of roller 78 allows both opening solenoid face 41 and closing solenoid face 51 to be placed close to armature 70, which allows relatively small current in either coil to produce a relatively large attracting force on armature 70. The geometry and arrangement of armature 70 in dual solenoid assembly 32, spring 34, block 35, movable contact 16, and fixed contact 24 provides armature 70 with 2 latching positions resistant to external forces and vibration, exerting substantial force between movable contact 16 and fixed contact 24, while requiring very little energy to move from one position to another. The design provides a relatively large ratio between the current carrying capacity of movable conductor 2 and the current necessary to switch the device between the opened or closed positions.

The first preferred embodiment provides an efficient switching device that is sealed, relatively small, switches with a relatively small amount of energy, latches in either a closed or opened position without the need of any more current, is resistant to vibration and external forces, while providing a relatively large electrical advantage between conducting capacity and actuating current. It also is simple in design and inexpensive to manufacture.

II. The Second Preferred Embodiment-an automatic battery protecting device

In the second preferred embodiment, Referring to FIGS. 6A and 2A, a battery protecting device with a switching device 101 operates and is substantially similar to the switching device 1 in the first preferred embodiment.

Referring to FIG. 6A, switching device 101 includes a movable conductor 102 and a fixed conductor 103, both made of an electrically conducting material preferably of copper but not limited to other materials, and a hermetically sealed housing 104. FIG. 8 shows the geometry of the movable conductor 102 which is roughly a rectangular bar with bends, and a formed, curved end.

Referring to FIGS. 6A, 12, 13 and 14, a terminal adaptor assembly 206 is shown connected to conductors 102 and 103. Movable conductor 102 begins with a rounded movable terminal end 105, also referred to as an inner collar, bent to have a truncated frustum conical inside shape fitting the shape of a positive battery post but with a small slot 117 at its edges, then has a first bend 106, passes through passage 107 of housing 104, to a 90° bend 108, a straight length 109, a first 180° bend 110, a straight length 111, a second 180° bend 112, a straight length 113, a third 180° bend 114, a straight length 115, and ends in movable contact 116. The shape can be economically formed from sheet metal. The folded section allows the movable conductor 102 to act as a cantilever spring or biasing means with reduced stiffness to force at movable contact 116, while remaining relatively short in length. The shape provides a conductor with a short height consistent with the short height of the battery protecting device.

Fixed conductor 103 has a shape similar to the adjacent portions of movable conductor 102, beginning with a rounded fixed terminal end 120, also referred to as an outer collar, slightly larger than movable terminal end 105, so as to fit uniformly around movable terminal end 105 with a small gap, with a first bend 121, passing through passage 107 of housing 104, to a 90° bend 122, a straight length 123, and ending in fixed contact 124. Fixed conductor 103 is covered with a thin, electrically insulating film 130 on its bottom side extending to the inside surface of its rounded, fixed terminal end 120, providing electrical separation between movable conductor 102 and fixed conductor 103 along these surfaces. Spacer 131 is glued to housing 104 and provides a small clearance between housing 104 and movable conductor 102 along straight length 108. The assembly of fixed conductor 103, film 130, movable conductor 102, and spacer 131 is shown in FIG. 8. Movable conductor 102, film 130, and fixed conductor 103 are secured to housing 104 by a hermetic seal at passage 107. The unrestrained position of the movable contact 116 is a small distance above and out of contact with fixed contact 124.

Referring to FIG. 6A, switching device 101 includes dual solenoid assembly 132, pivot 133, helical spring 134, and block 135 with the same construction and operation respectively as dual solenoid assembly 32, pivot 33, spring 34, and block 35 of the first preferred embodiment shown in FIG. 2A. Also included in switching device 101 is control circuit 190, jumper wire 197, jumper wire 199, face wire 185, cord 195, and proximity assembly 180. Control circuit 190 has terminals to which wires are connected. One end of jumper wire 197 is connected to movable conductor 102, and the other end is connected to control circuit 190. One end of jumper wire 199 is connected to fixed conductor 103, and the other end is connected to control circuit 190. One end of face wire 185 is connected to body 160 near body closing end 164, and the other end is connected to control circuit 190. One end of cord 195 is connected to control circuit 190, and the other end passes with a hermetic seal through passage 186 of housing 104 and is connected to ground clamp 196.

Dual solenoid assembly 132 consists of an opening solenoid 140, a closing solenoid 150, a magnetically conducting body 160, a magnetically conducting armature 170, and roller 178. Opening solenoid 140 includes a magnetically conducting opening solenoid core 142, a magnetically conducting opening solenoid face 141, and opening coil 143. Opening solenoid core 142 is fastened to body 160 at body opening end 165. Opening coil wire 144, and opening coil ground wire 145 are the 2 ends of opening coil 143 and are connected to terminals of control circuit 190. Closing solenoid 150 includes a magnetically conducting closing solenoid core 152, a magnetically conducting closing solenoid face 151, and closing coil 153. Closing solenoid core 152 is fastened to body 160 at body closing end 164. Closing coil wire 154, and closing coil ground wire 155 are the 2 ends of closing coil 152 and are connected to terminals of control circuit 190.

FIG. 6B shows the detail of proximity assembly 180 which includes left clip 187, right clip 188, an opening sensor wire 181, a closing sensor wire 182, left block 183, and right block 184. Opening solenoid face 141 and closing solenoid face 151 are connected to each other electrically through the structure of the dual solenoid assembly 132 and are thereby connected electrically to body closing end 164, as shown in FIG. 6A, which is electrically connected to face wire 185. Left clip 187 is made of a resilient, electrically insulating material and fits tightly around the upper edge of body 160 to the left of pivot point 163. Left clip 187 contains a circular slot into which opening sensor wire 181 fits tightly.

Referring to FIG. 7B, one end of opening sensor wire 181 is bent about 90°, forming a cantilever spring which normally contacts opening solenoid face 141 with a small force. The other end of opening sensor wire 181 is connected to control circuit 190, as shown in FIG. 6A. Referring to FIG. 6B, right clip 188 is identical to left clip 187 and fits tightly on body 160 to the right of pivot point 163. Closing sensor wire 182 fits tightly into right clip 188. One end of closing sensor wire 182 is bent about 90°, forming a cantilever spring which normally contacts closing solenoid face 151 with a small force. The other end of closing sensor wire 182 is connected to control circuit 190, as shown in FIG. 6A. Left block 183 is made of an electrically insulating material and is fastened on the left side of armature 170 near roller 178. Right block 184 is made of an electrically insulating material and is fastened on the right side of armature 170 near roller 178. As shown by armature radial line 167 in FIG. 7B, roller 178 and contact 116 are in radial alignment when contact 116 is in the closed position.

Figure 9:
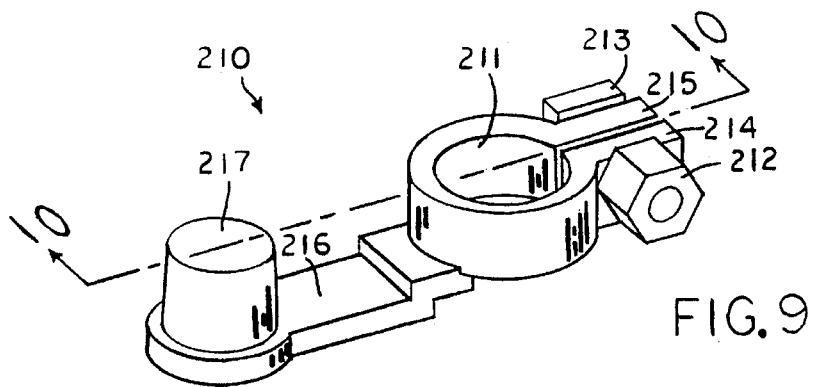
FIG. 9 is a perspective view of the terminal adaptor of the second preferred embodiment.
Figure 10:
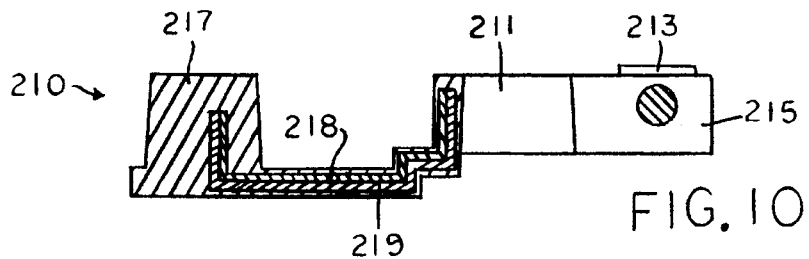
FIG. 10 is a sectional view of FIG. 9 taken along line 10—10.

Referring to FIG. 9, the battery protecting device is installed with the aid of a terminal adaptor 210. Terminal adaptor 210 is a cast lead conductor with a truncated conical inside surface 211 fitting the outside surface of rounded fixed terminal end 120 in FIG. 6A. Nut 212 screws onto bolt 213 which is inserted through holes in ear 214 and ear 215. Ear 214 and ear 215 form a clamp which connects to post 217 with shaft 216. Post 217 has an outside surface identical to the outside surface of a positive battery post. Referring to FIG. 10, shaft 216 includes bent steel bar 218 and bent copper bar 219 in its center to provide increased structural strength and conductivity.

Figure 11:
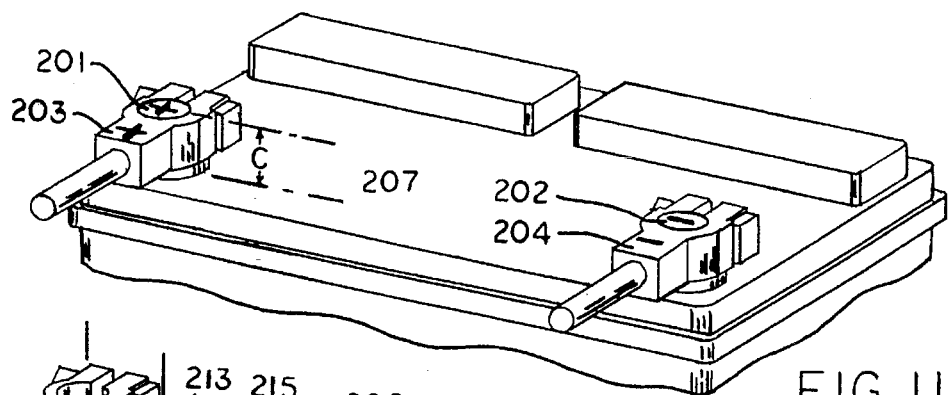
FIG. 11 is a fragmentary, perspective view of a battery top with normal connections.

Referring now to FIG. 11, the normal connection of an electrical circuit to a battery is usually made with a positive battery clamp 203 fastened to the positive battery post 201, and a negative battery clamp 204 fastened to the negative battery post 202. The battery has a planar top surface 207 and each battery post has a height C.

Figure 12:
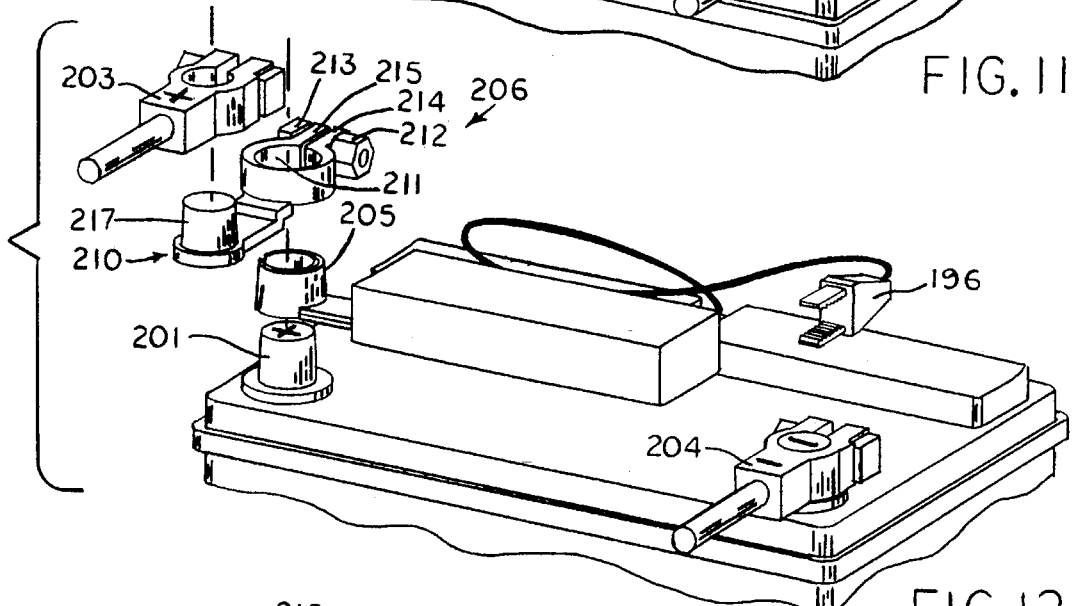
FIG. 12 is the perspective view of FIG. 11 with the switching device and the terminal adaptor of the second preferred embodiment shown in exploded assembly.
Figure 13:
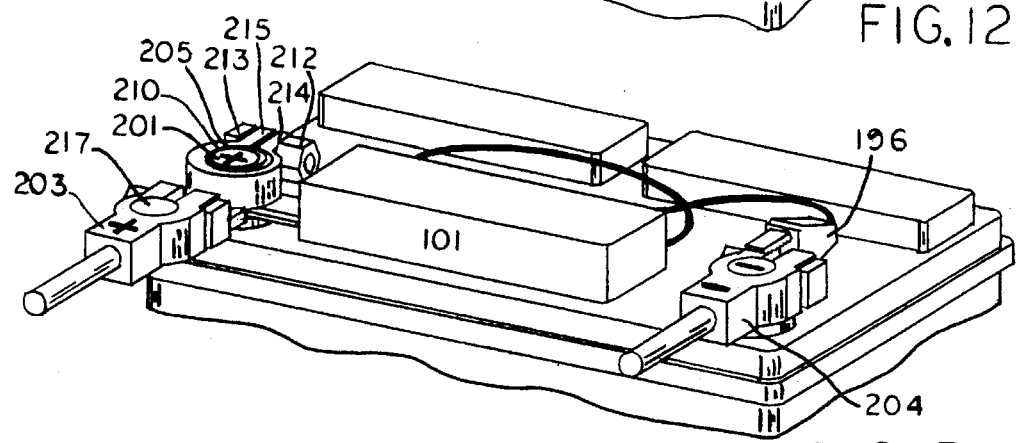
FIG. 13 is the perspective view of FIG. 12 with the switching device and terminal adaptor of the second preferred embodiment installed.
Figure 14:
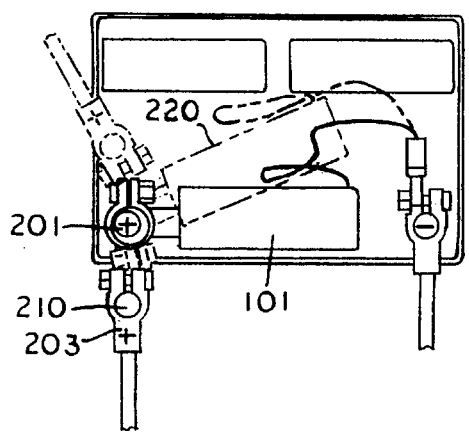
FIG. 14 is a top plan view of FIG. 13 with the switching device and terminal adaptor shown in 2 positions.

Referring to FIGS. 12 and 13, and describing the installation of the switching device 101, positive battery clamp 203 is removed from positive battery post 201. The switching device's terminal 205 of assembly 206 is placed on the positive battery post 201. Terminal adaptor 210, also included in assembly 206 and referred to as connecting means, with an inside surface 211 fitting the outside surface of the terminal 205, is placed on the terminal 205 as shown in FIG. 13. Nut 212 of terminal adaptor 210 is turned clockwise into bolt 213, forcing ear 214 and ear 215 of terminal adaptor 210 together, tightening terminal adaptor 210 to terminal 205 and terminal 205 to positive battery post 201. Battery clamp 203 is fastened to post 217 of terminal adaptor 210. Clamp 196 of switching device 101 fastens to negative battery clamp 204, completing installation. An advantage of this arrangement is that it provides for the connection of the switching device 101 between the battery and load circuit with a common wrench, without cutting into the electrical wiring, without providing jumper clamps, or otherwise modifying the electrical circuit. Another advantage of this arrangement, referring now to FIG. 14, is that it allows the placement of the switching device 101 and the terminal adaptor 210 to be rotated about the center axis of the positive battery post 201, allowing the switching device 101 and the positive battery clamp 203 to be placed in the most convenient position and allowing trouble free connection to a wide combination of battery top designs and positive battery clamp positions, thereby allowing adaption to a wide variety of electrical systems. Phantom line 220 shows one example of a range of orientations of switching device 101, terminal adaptor 210 and positive battery clamp 203. In this regard, the height D, as shown in FIG. 5, of housing 104 is about the same as height C, shown in FIG. 11, of the terminal post above battery face 207. A further advantage of this arrangement is that it allows placement of the battery protection device on the battery top and avoids more difficult installation of a switching unit to a nearby area which may include interfering equipment or fastening difficulties. A further advantage of this arrangement is it allows the battery protecting device to be easily added or removed as an accessory to a battery circuit.

FIG. 6A shows switching device 101 in the opened position. FIG. 6B shows an expanded view of proximity assembly 180 in the opened position. FIG. 7A shows switching device 101 in the closed position. FIG. 7B shows an expanded view of proximity assembly 180 in the closed position.

Referring to FIG. 6A, when closing coil 153 is energized, armature 170 is attracted to closing solenoid face 151. Armature 170 moves to the right, forcing roller 178 onto movable contact 116, and forcing movable contact 116 down into contact with fixed contact 124. Armature 170 continues to move to the right against closing solenoid face 151, as shown in FIG. 7A, where the downward force on armature 170, from spring 134, causes roller 178 to force movable contact 116 and fixed contact 124 together tightly, and causes armature 170 to lock with a biasing force to the right against closing solenoid face 151. Referring to FIG. 7A, armature 170 has latched in the closed position, making an electrical pathway between movable conductor 102 and fixed conductor 103.

Referring to FIG. 7A, when opening coil 143 is energized, armature 170 is attracted to opening solenoid face 141. Armature 170 moves to the left, forcing roller 178 off movable contact 116 and onto block 135, allowing movable contact 116 to move upward to its unrestrained position, out of contact with fixed contact 124. Armature 170 continues to move to the left against opening solenoid face 141, as shown in FIG. 6A, where the downward force on armature 170, from spring 134, causes armature 170 to lock with a biasing force to the left against opening solenoid face 141. Referring to FIG. 6A, armature 170 has latched in the opened position, breaking the electrical pathway between movable conductor 102 and fixed conductor 103.

Because the battery protecting device includes a switching mechanism with the design features of the switching device 1 of the first preferred embodiment, it switches efficiently with a relatively small amount of energy, remains latched without holding current, and is resistant to vibration and outside forces. Closing coil 153 or opening coil 143 may be energized with a relatively small amount of current for only a brief time in order to actuate switching device 101 to either the closed or opened position. The use of only a small amount of actuating current for switching allows the battery protecting device to be used effectively with even a very weak battery.

Referring to FIG. 6B, when armature 170 is in the opened position against opening solenoid face 141, closing sensor wire 182 contacts closing solenoid face 151. Referring to FIG. 7B, when armature 170 is in the closed position against closing solenoid face 151, right block 184 forces closing sensor wire 182 out of contact with closing solenoid face 151. Referring to FIG. 7B, when armature 170 is in the closed position against closed solenoid face 151, opening sensor wire 181 contacts opening solenoid face 141. Referring to FIG. 6B, when armature 170 is in the opened position against opening solenoid face 141, left block 183 forces opening sensor wire 181 out of contact with opening solenoid face 141.

Figure 15:
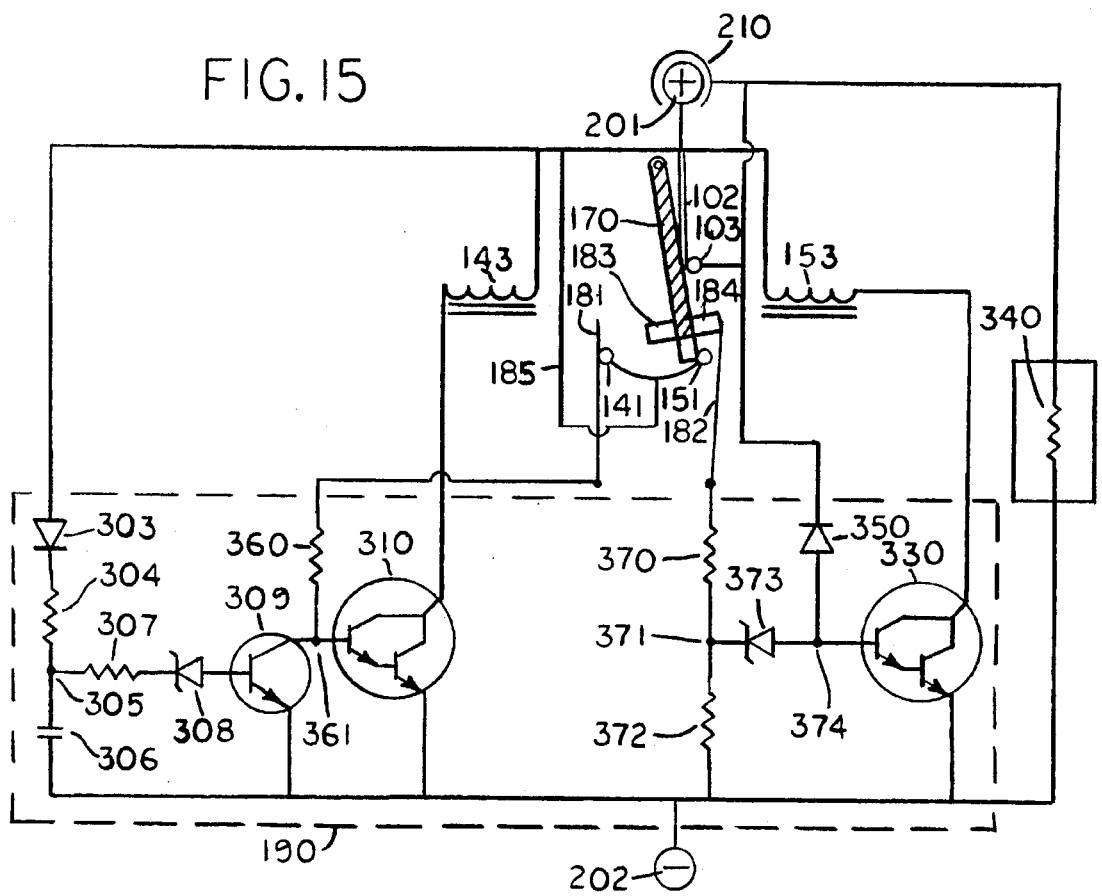
FIG. 15 is a schematic drawing of the control system of the second preferred embodiment in the closed position.
Figure 16:
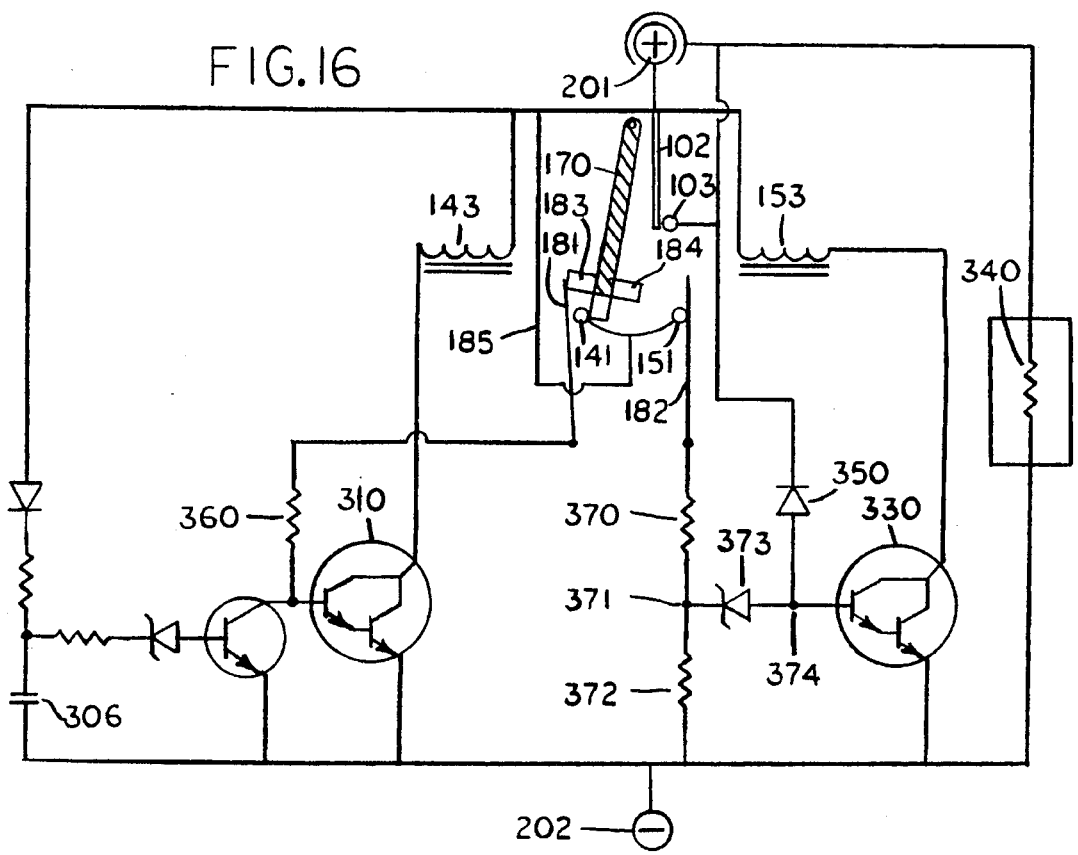
FIG. 16 is the schematic drawing of FIG. 15 in the opened position.

FIG. 15 and 16 represent the control system of the battery protection device. The control system protects the battery from discharge, provides automatic operation, and guarantees its ability to supply large currents such as those necessary to start a vehicle. FIG. 15 represents the control system in the closed position. FIG. 16 represents the control system in the opened position.

Referring to FIG. 15, positive battery post 201 is connected to 5 branch circuits. The first branch circuit of positive battery post 201 connects to the anode of diode 303, to resistor 304, and to junction 305 which connects to 2 branch circuits. The first branch circuit of junction 305 connects to capacitor 306, to the negative battery post 202, which hereafter will be called the ground, and the second branch circuit of junction 305 connects to resistor 307, to the cathode of Zener diode 308, to the base of transistor 309. The second branch circuit of positive battery terminal 201 is connected to opening coil 143, to the collector of Darlington transistor 310. The third branch circuit of positive battery post 201 is connected to face wire 185 which is connected to both opening solenoid face 141 and closing solenoid face 151. The fourth branch circuit of positive battery post 201 connects to closing coil 153, to the collector of Darlington transistor 330. The fifth branch circuit of positive battery terminal 201 connects to the movable conductor 102. The lower end of movable conductor 102 forms a switch which when moved to the right contacts fixed conductor 103. Fixed conductor 103 is connected to 2 branch circuits. The first branch circuit of fixed conductor 103 connects to terminal adaptor 210, to battery load 340, to ground 202. The second branch circuit of fixed conductor 103 connects to the cathode of diode 350, to junction 374 which connects to both the base of Darlington transistor 330 and to the anode of Zener diode 373. The emitters of transistor 309, Darlington transistor 310, and Darlington transistor 330 are connected to ground 202. One end of opening sensor wire 181 normally contacts opening solenoid face 141 in the absence of outside forces. The other end of opening sensor wire 181 connects to resistor 360 which connects to junction 361. Junction 361 connects to both the collector of transistor 309, and the base of Darlington transistor 310. One end of closing sensor wire 182 normally contacts closing solenoid face 151 in the absence of outside forces. The other end of closing sensor wire 182 is connected to resistor 370 which is connected to junction 371. Junction 371 connects to both the cathode of Zener diode 373, and to resistor 372 which connects to ground.

Opening coil 143 and closing coil 153 create magnetic forces which move armature 170 to the left or to the right. The movements of left block 183, right block 184, and movable conductor 102 are coupled to the movement of armature 170. When the lower end of movable conductor 102 moves to the left, it breaks contact with fixed conductor 103 as shown in FIG. 16. Referring to FIG. 15, when armature 170 is to the right in the closed position, it forces movable conductor 102 to the right, into contact with fixed conductor 103, opening sensor wire 181 contacts opening solenoid face 141, and insulating right block 184 forces closing sensor wire 182 out of contact with closing solenoid face 151. Referring to FIG. 16, when armature 170 is to the left in the opened position, movable conductor 102 is out of contact with fixed conductor 103, closing sensor wire 182 contacts closing solenoid face 151, and insulating left block 183 forces opening sensor wire 181 out of contact with opening solenoid face 141.

The battery load 340 comprises all the circuits the battery is connected to and may vary from no load to massive cranking load, and includes shorts and other parasitic loads. Battery load 340 may include capacitive and inductive elements. A vehicle electrical system may include a small clock which uses only 1 milliamp of current and a starting motor that can demand 500 amps of current for a few seconds. The battery itself usually has a sell internal current leak between its positive and negative posts, creating an internal parasitic load on the order of 2 to 5 milliamps. Control circuit 190, within the dashed lines of FIG. 15, includes resistors 304, 307, 360, 370, and 372, capacitor 306, diodes 303, and 350, Zener diodes 308, and 373, transistor 309, and Darlington transistors 310, and 330. Resistor 304 is the internal resistance of diode 303. The components of control circuit 190 are all basic, readily available, inexpensive, electronic parts.

For the purpose of discussion, when no current flows through the base-emitter path of a transistor (or Darlington transistor), the resistance of its collector-emitter path is very high, preventing current flow. When current flows through the base-emitter path of a transistor (or Darlington transistor), the resistance of its collector-emitter path becomes very low, permitting current flow. Transistors (and Darlington transistors) have a characteristic base-emitter saturation voltage above which the resistance of the base-emitter path is greatly reduced. Current may flow through a Zener diode only when the voltage between the cathode and anode of the Zener diode is more than the breakdown voltage of the Zener diode. The term "battery voltage" means the voltage between the positive battery post 201 and the negative battery post 202.

The following description of the operation of the control system describes operation with a normally healthy battery, operation with large loads for short and long periods, operation when loads drain the battery over a period of time, and operation of automatic resetting. The description uses examples of battery voltage and Zener diode values that are particularly applicable to a common 12 volt, lead-acid, vehicle battery and electrical system, but is not meant to limit its use to other voltages, battery types, or applications.

In operation, normal battery voltage of a healthy, 12 volt battery is above 11.5 volts. When this is so, referring to FIG. 15, movable conductor 102 contacts fixed conductor 103 and battery current flows from the positive battery post 201, through movable conductor 102, to fixed conductor 103, to terminal adaptor 210, through any battery load 340, to negative battery post 202. Battery voltage passes from positive battery post 201, through diode 303 and resistor 304, to junction 305, and capacitor 306 charges until it reaches battery voltage. Resistor 304 limits the amount of current flow to protect diode 303 and capacitor 306. Battery voltage at junction 305 causes current to flow through resistor 307, Zener diode 308, and through the base-emitter path of transistor 309. Current through the base-emitter path of transistor 309 causes the collector-emitter path of transistor 309 to have low resistance. The low resistance of the collector-emitter path of transistor 309 causes current to flow from positive battery post 201, through face wire 185, to opening solenoid face 141, to opening sensor wire 181, to resistor 360, through the collector-emitter path of transistor 309, to ground 202. The low resistance path through the collector-emitter path of transistor 309, to ground 202 causes voltage at junction 361 to be very low, preventing current from flowing through the base-emitter path of Darlington transistor 310. Diode 350 prevents current from flowing from the positive battery post 201, through movable conductor 102, to fixed conductor 103 and to junction 374. Right block 184 separates closing sensor wire 182 from closing solenoid face 151, preventing current flow from the positive battery post 201, through face wire 185, to closing solenoid face 151, to closing sensor wire 182. This is the normal operating condition for the battery protecting device for a vehicle battery. The battery has a normal voltage, and is able to power electrical loads. Because resistor 307 and resistor 360 have large values, operating current in the closed position is very small, and only about 1 milliamp of current is used in this example.

Referring to FIG. 15, with the battery protecting device in the closed position, when a starter motor is cranked or other large current flows through battery load 340, battery voltage at positive battery post 201 quickly drops below 11 volts. The voltage at junction 305 remains at the previous higher battery voltage stored in capacitor 306, and capacitor 306 begins discharging stored charge through resistor 307, Zener diode 308, and the base-emitter path of transistor 309, which causes the collector-emitter path of transistor 309 to have low resistance. The low resistance of the collector-emitter path of transistor 309 causes current to flow from positive battery post 201, to face wire 185, to opening solenoid face 141, to opening sensor wire 181, to resistor 360, through the collector-emitter path of transistor 309, to ground 202. Diode 303 prevents charge from flowing from capacitor 306, to resistor 304, to positive battery post 201. Capacitor 306 stores enough charge to allow large current flows from the battery for a short period of time. Capacitor 306 thus is also referred to as delay means, which as will be discussed, delays operation of the opening solenoid during conditions of large current flows. If the large current flow through battery load 340 stops, battery voltage at positive battery post 201 returns to a higher value, and capacitor 306 quickly recharges to that higher value. If the large current flow to battery load 340 continues, capacitor 306 loses enough charge to drop its voltage to the breakdown voltage of Zener diode 308, and current cannot flow through Zener diode 308, to the base of transistor 309, causing the collector-emitter path of transistor 309 to have high resistance. The high resistance of the collector-emitter path of transistor 309 causes current to flow from positive battery post 201, to face wire 185, to opening solenoid face 141, to opening sensor 181, to resistor 360, through the base-emitter path of Darlington transistor 310, to ground 202, causing the collector-emitter path of Darlington transistor 310 to have low resistance. The low resistance of the collector-emitter path of Darlington transistor 310 causes current to flow from positive battery post 201, through opening coil 143, through the collector-emitter path of Darlington transistor 310, to ground 202, energizing opening coil 143. Referring to FIG. 16, armature 170 moves to the left against opening solenoid face 141 and causes the following changes:

1) Movable conductor 102 moves to the left, out of contact with fixed conductor 103, stopping current flow to fixed conductor 103, and to battery load 340.

2) Left block 183 moves to the left and separates opening sensor wire 181 from opening solenoid face 141, breaking the path for current through resistor 360, to the base-emitter path of Darlington transistor 310, and causes high resistance through the collector-emitter path of Darlington transistor 310. The high resistance of the collector-emitter path of Darlington transistor 310 stops current flow through opening coil 143. The sensor wires and associated circuitry are thus also referred to as means for sensing the armature position.

3) Right block 184 moves to the left, allowing closing sensor wire 182 to contact closing solenoid face 151.

The control system is now in the opened position as shown in FIG. 16. The movable conductor 102 and fixed conductor 103 have separated, and current no longer flows to any battery load 340 or short circuits. The operation of the control system allows the battery to deliver a large amount of current for short periods of time, for uses such as starting an engine, while preventing power loss from large, constant loads and preserving the battery's capacity to store power. The value of capacitor 306 determines the length of time the battery protecting device allows before large current loads are switched off. A time delay of 15 seconds works well for vehicle systems.

The control circuit behaves in a similar way to disconnect smaller loads before the battery is discharged. Referring to FIG. 15 with the battery protecting device in the closed position, when small or moderate current is drawn through battery load 340 without properly recharging the battery, the battery slowly loses its stored charge and battery voltage slowly drops. As battery voltage drops, capacitor 306 loses charge and the voltage at junction 305 is the same as the slowly falling battery voltage. When battery voltage and the voltage at junction 305 drops below the breakdown voltage of Zener diode 308, which is about 11.0 volts, Zener diode 308 blocks current flow through the base-emitter path of transistor 309, causing the collector-emitter path of transistor 309 to have high resistance. The high resistance of the collector-emitter path of transistor 309 causes current to flow from positive battery post 201, through face wire 185, to opening solenoid face 141, to opening sensor wire 181, to resistor 360, through the base-emitter path of Darlington transistor 310, to ground 202, causing the collector-emitter path of Darlington transistor 310 to have low resistance. The low resistance of the collector-emitter path of Darlington transistor 310 causes current to flow from positive battery post 201, through the opening coil 143, through the collector-emitter path of Darlington transistor 310, to ground 202, energizing opening coil 143. Armature 170 moves to the left against opening solenoid face 141, and the device switches to the opened position, disconnecting the battery load 340 from the positive battery post 201 as shown in FIG. 16.

Referring now to FIG. 16 with the battery protecting device in the opened position, when battery drains to battery load 340 are switched off at 11.0 volts, the battery will equalize chemically and battery voltage and power will increase. Substantial cranking power still remains.

Describing the operation of automatic resetting of the control system, in a few minutes battery voltage increases to 11.5 volts and battery voltage passes from positive battery post 201, through face wire 185, to closing solenoid face 151, to closing sensor wire 182. The values of resistor 370 and resistor 372 are such that a voltage divider from closing sensor wire 182 to ground is formed through resister 370 and resistor 372 and the voltage at closing sensor wire 182, which is 11.5 volts, impresses a voltage at junction 371 greater than the breakdown voltage of Zener diode 373, which is about 11.0 volts. The voltage at junction 371 drops across Zener diode 373 to a small value at junction 374. If battery load 340 is still connected, the small voltage at junction 374 causes current to flow through diode 350, through fixed conductor 103, to battery load 340, to ground 202. The current through this branch will be very small due to the large value of the resistance of resistor 370. If battery load 340 is disconnected or its reactance large, the small voltage at junction 374 will cause current to flow through the base-emitter path of Darlington transistor 330 causing the collector-emitter path of Darlington transistor 330 to have low resistance. The low resistance of the collector-emitter path of Darlington transistor 330 causes current to flow from positive battery post 201, through the closing coil 153, through the collector-emitter path of Darlington transistor 330, to ground 202, energizing the closing coil 153. Referring to FIG. 15, armature 170 moves to the right against closing solenoid face 151 and causes the following changes:

1) Movable conductor 102 contacts fixed conductor 103, allowing current from positive battery post 201 to power battery load 340.

2) Right block 184 moves to the right and forces closing sensor wire 182 out of contact with closing solenoid face 151, stopping current flow through resistor 370, Zener diode 373, and to the base-emitter path of Darlington transistor 330, which causes the collector-emitter path of Darlington transistor 330 to have high resistance. The high resistance of the collector-emitter path of Darlington transistor 330 stops current flow from the positive battery post 201, to the closing coil 153.

3) Left block 183 moves to the right allowing opening sensor wire 181 to contact opening solenoid face 141. Operating current in the opened position is very small at about 0.3 milliamps for this example. These changes return the control system back to the closed position shown in FIG. 15.

This completes a full cycle.

The resetting part of the control system includes junction 374, Darlington transistor 330, diode 350 and battery load 340 that form a load sensing circuit. When a battery recovers to normal voltage, it imposes a small voltage at junction 374. The small voltage at junction 374 causes current to flow through the base-emitter path of Darlington transistor 330 and reset the battery protecting device only if the base-emitter saturation voltage of Darlington transistor 330 is small compared to the voltage drop across diode 350 and battery load 340. In the 12 volt system shown, any load which would ordinarily operate with over 10 milliamps of current will prevent resetting. The load current level of battery load 340 which prevents resetting can be made larger by inserting a resistor or diode between Junction 374 and diode 350. The load level which prevents resetting can be made smaller by inserting a resistor or diode between junction 374 and the base of Darlington transistor 350.

When a load drains and weakens the battery, the control system switches power off to prevent the battery from being overdrained and damaged. The control system switches the power off at a voltage high enough so that power remains for the battery to be used without immediate recharging. This guarantees normal cranking power.

When the battery returns to normal, the control system automatically switches power back on, providing the loads have been removed or are very small. The load sensing ability of the control system prevents power from being further lost to the loads that have drained the battery, while allowing electrical equipment that uses very little power and is permanently on, such as clocks and sensors, to remained hooked up.

The second preferred embodiment provides a battery protecting device that prevents discharge of a battery, guarantees cranking, includes a load sensing ability to prevent further loss, operates automatically, switches battery power on and off efficiently with a relatively small amount of energy and current, operates with a relatively small amount of current, while being a small, sealed, conveniently installed accessory, fitting a wide variety of electrical systems, resistant to vibration and outside forces, and remaining simple and inexpensive to manufacture.

III. The Third Preferred Embodiment-an inexpensive battery protection device

In the third preferred embodiment, a battery protection device is provided which includes a manually resetting means, that is simpler and less expensive to manufacture than the second preferred embodiment of the invention.

Referring now to FIG. 18A, the battery protection device includes a terminal 205 and clamp 196 identical to the battery protection device of the second preferred embodiment shown in FIG. 6A, and referring to FIG. 13, is connected to the positive battery post 201 with terminal adaptor 201 and positive battery clamp 203 in an identical manner with the same advantages of being adapted to a wide variety of electrical systems, conveniently placed, and easily installed and removed as an accessory to a battery circuit.

Referring to FIG. 18A, switching device 401 contains a movable conductor 402, and a fixed conductor 403 both made of an electrically conductive material preferably of copper but not limited to other materials, within an hermetically sealed housing 404. Movable conductor 402 is roughly a rectangular bar with bends, and a formed, curved end. The terminal end of movable bar 402 is identical to the geometry of the terminal end of movable bar 102 of the second preferred embodiment shown in FIG. 6A. Referring to FIG. 18A, movable conductor 402 begins with a rounded movable terminal end 405, bent to have a truncated conical inside shape fitting the shape of a positive battery post but with a small slot 417 at its edges, then has a first bend 406, passes through passage 407 of housing 404, to a first 90° bend 408, to a straight length 409, a 180° bend 410, a straight length 415, and ends in movable contact 416. The shape can be economically punched and formed from sheet metal and has the advantages of providing a movable conductor 402 with reduced stiffness to force at the contact end while remaining relatively short in length and short in height. Fixed conductor 403 has a shape similar to the adjacent portions of movable conductor 402. Fixed conductor 403 begins with a rounded fixed terminal end 420, slightly larger than movable terminal end 405, so as to fit uniformly around end 405 with a small gap, then has a first bend 421, passes through passage 407 in housing 404, to a 90° bend 422, to a straight length 423, and ends in fixed contact 424. Fixed conductor 403 is covered with a thin insulating film 430 on its bottom side extending to the inside surface of its rounded terminal end 420, providing electrical separation between movable conductor 402 and fixed conductor 403 along these surfaces. The unrestrained position of movable contact 416 is a small distance above fixed contact 426.

Also included in the switching device 401 is a triangular bar shaped pivot 433, helical spring 434, small block 435, stop block 451, control circuit 490, jumper wire 497, cord 195, single solenoid assembly 432, reset rod 436, reset button 437, and membrane 439. Stop block 451 is secured in a fixed position as part of housing 404. Electronic control circuit 490 has terminals to which wires are connected. One end of jumper wire 497 is connected to control circuit 490 and the other end is connected to fixed conductor 403. One end of cord 195 connects to control circuit 490, and the other end passes through a hermetically sealed passage 486 in housing 404 and connects to clamp 196. Solenoid assembly 432 includes an opening solenoid 440, a magnetically conducting body 460, and a magnetically conducting armature 470. Opening solenoid 440 includes a magnetically conducting opening solenoid core 442, a magnetically conducting opening solenoid face 441, and opening coil 433. Opening solenoid core 442 is fastened to body 460 at body opening end 465. Opening coil wire 444 and opening ground wire 445 are the two ends of opening coil 443 and connect to control circuit 490. Armature 470 is beveled at pivot end 471 to fit loosely in pivot slot 462 in body 460. Axle 477 attaches roller 478 to armature 470. Stiff cylindrical reset rod 436 fits at its left end into a shallow hole 479 in armature 470, and at its right end into reset button 437 which lays in passage 438 of housing 404. Elastic membrane 439 seals passage 438 while remaining flexible.

FIGS. 18A and 18B show the switching device 401 in the closed position. FIGS. 19A and 19B show switching device 401 in the opened position.

Referring to FIG. 18A, solenoid assembly 432 is supported at one end by a pivot 433 which fits in the small pivot slot 461 in body 460 and rests against housing 404. The other end of solenoid assembly 432 is forced downward by spring 434 on body 460, which forces armature 470 downward against roller 478, and roller 478 downward against small block 435, forcing movable contact 416 downward against fixed contact 424. In the closed position shown in FIG. 18A, the strong downward force on armature 470 from spring 434 is at an angle slightly less than 90° to the top face of small block 435, locking armature 470 with a biasing force to the left against stop block 451.

The battery protection device acts as a small, resettable circuit breaker with a battery protecting control system.

Referring to FIG. 18A, when opening coil 443 is energized, a magnetic field is created along the long axis of opening solenoid core 442, setting up a magnetic circuit from opening solenoid core 442, to body opening end 465, through solenoid body 460, to armature pivot slot 462, and into armature 470, attracting armature 470 to the right toward opening solenoid face 441. This force overcomes the biasing force on armature 470 against stop block 451, and forces armature 470 and roller 478 to move to the right, pivoting about pivot point 463. Referring to FIGS. 18B, 19B, 18A and 19A, roller 478 at the end of armature 470 rolls to the right, off small block 435, releasing the downward force on small block 435 and movable contact 416, and causes solenoid body 460 to pivot about pivot slot 461, downward to the top of stop block 451 at point 456, restraining the downward movement of solenoid body 460. Referring to FIG. 19B, movable conductor 402 moves upward to its unrestrained position out of contact with fixed contact 424, and breaks the electrical pathway between movable conductor 402 and fixed conductor 403. Armature 470 and roller 478 come to rest, latching between opening solenoid face 441 and the right side of small block 435. When movable conductor 402 and fixed conductor 403 are separated as shown in FIG. 19A, current from the positive battery post cannot flow to the battery load.

Referring to FIG. 19A and 19B, when a manual force is applied to the left against elastic membrane 439, the force is transmitted through button 437 and reset red 436 against armature 470 at hole 479, forcing armature 470 to pivot clockwise and to the left about pivot point 463, forcing roller 478 to the left onto small block 435, and forcing movable contact 416 down against fixed contact 424, raising armature 470 up at pivot end 471 and forcing solenoid body 460 up from the top of stop block 451 at point 456 and coupling the downward force of spring 434 through body 460, armature 470, and roller 478, forcing armature 470 to move to the left and come to rest against the right face of stop block 451 with a biasing force to the left from spring 434 and locking it into place. Movable contact 416 and fixed contact 424 have been forced together, completing an electrical pathway between movable conductor 402 and fixed conductor 403 as shown in FIG. 18A. Current from the positive battery post can conduct through movable conductor 402, to fixed conductor 403, to the terminal adaptor, to the positive battery clamp, to the battery load.

Referring to FIGS. 18A and 2A, the arrangement of movable conductor 402, fixed conductor 403, roller 478, armature 470, body 460, pivot 433, spring 434, and opening solenoid 440 in FIG. 18A is substantially the same as similar components of the first preferred embodiment in FIG. 2A, resulting in the same advantages of providing a switching device that forces a relatively large movable conductor 402 into contact with fixed conductor 403 with substantial force, latches in the closed position without any holding current, and switches from the closed to the opened position efficiently with a relatively small amount of energy and current, and with a relatively large ratio between current carrying capacity of movable conductor 402 and the current necessary to switch the device from the closed to opened position. The elimination of folds and lengthening of the cantilever portion of movable conductor 402 reduces the overall length of movable conductor 402 and reduces costs. The opposite orientation of opening solenoid 440 allows switching device 401 to be reduced in length. Stop block 451 provides both the restraint of armature 470 in the closed position, similar to closing solenoid face 51 and the restraint of downward forces from spring 434 in the opened position similar to block 35. Referring to FIGS. 18B and 19B, small block 435 and surface 418 of movable conductor 402 provide a cam surface that allows roller 478 to move a short distance to the right from the closed to the opened position allowing movable conductor 402 to separate from fixed contact 424 and allowing roller 478 to latch between small block 435 and opening solenoid face 441. Surface 418 and small block 435 also allow roller 478 to roll up on top of small block 435, transmit downward force from spring 434 to movable contact 416 against fixed contact 424, and latch armature 470 in the closed position. The reset mechanism inexpensively provides switching from the opened to the closed position with a simple manual operation.

Figure 20:
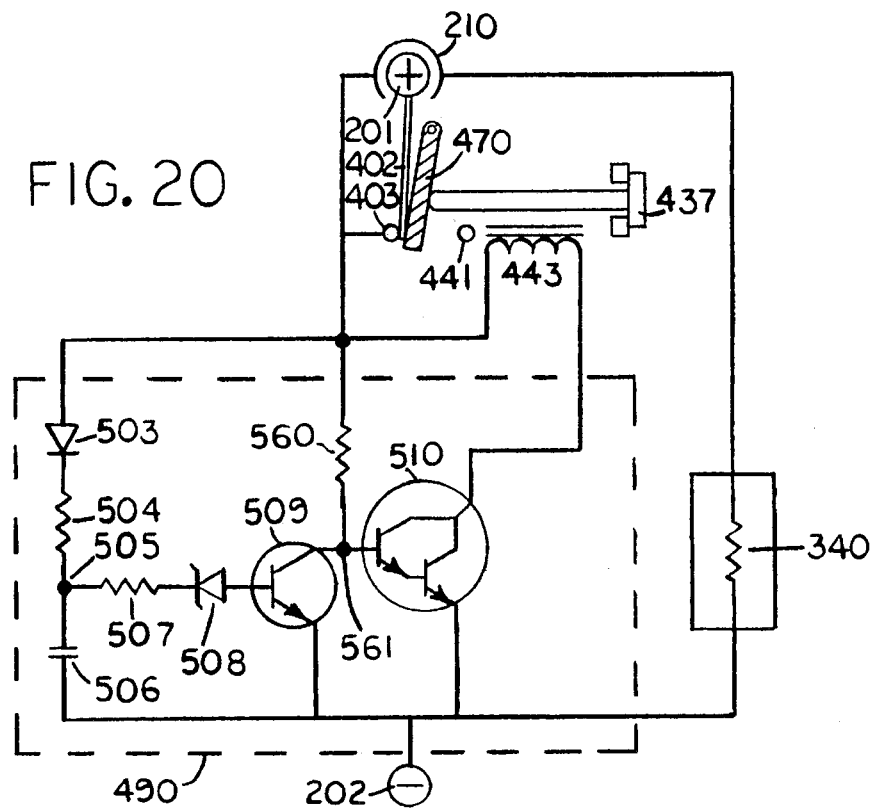
FIG. 20 is a schematic drawing of the control system of the third preferred embodiment in the closed position.
Figure 21:
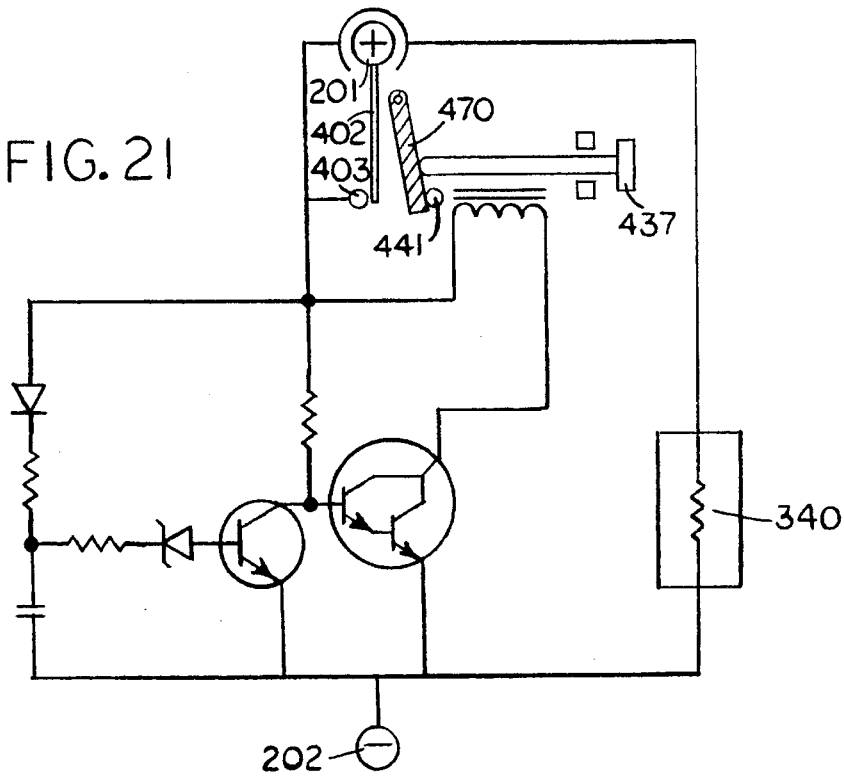
FIG. 21 is a schematic drawing of FIG. 20 in the opened position.
Figure 22:
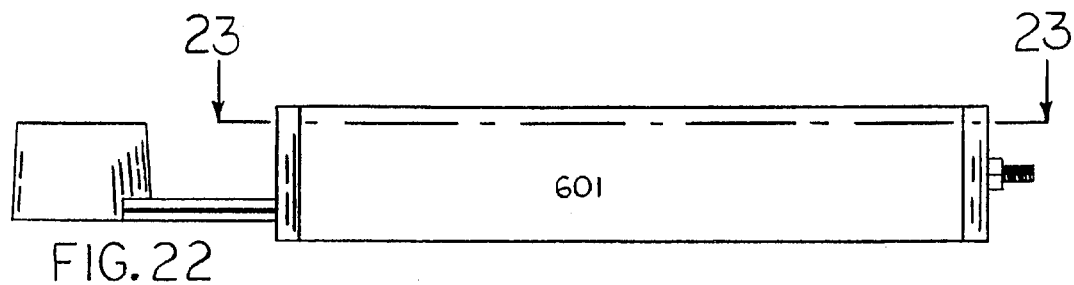
FIG. 22 is a side elevation view of the switching device of the fourth preferred embodiment.

A control system controls the operation of the third preferred embodiment. FIG. 20 represents the control system in the closed position. FIG. 21 represents the control system in the opened position.

Referring now to FIG. 20, positive battery post 201 is connected to movable conductor 402 which forms a switch with fixed conductor 403. Fixed conductor 403 connects to 4 branch circuits. The first branch circuit of fixed conductor 403 connects to terminal adaptor 210, to battery load 340, to negative battery post 202, which hereafter will be called the ground 202. The second branch circuit of fixed conductor 403 connects to the anode of diode 503, to resistor 504, and to junction 505 which connects to 2 branch circuits. The first branch circuit of junction 505 connects to capacitor 506 to ground 202. The second branch circuit of junction 505 connects to resistor 507, to the cathode of Zener diode 508, to the base of transistor 509. The third branch circuit of fixed conductor 403 connects to resistor 560, to junction 561, which connects to both the collector of transistor 509 and the base of Darlington transistor 510. The fourth branch circuit of fixed conductor 403 connects to opening coil 443 to the collector of Darlington transistor 510. The emitters of transistor 509, and Darlington transistor 510 are connected to ground 202. Movable conductor 402 forms a 2 position switch in and out of contact with fixed conductor 403. When opening coil 443 is energized, it creates a magnetic force which moves armature 470 to the right, and allows movable conductor 402 to move to its unrestrained position, slightly to the right, out of contact with fixed conductor 403. Manual reset button 437 can force armature 470 to the left, which forces movable conductor 402 to the left, latching movable conductor 402 into contact with fixed conductor 403. The electronic circuit elements and load are identical to similar elements in the second preferred embodiment shown in FIG. 15. Control circuit 490 within the dashed lines of FIG. 20 includes resistors 504, 507, and 560, capacitor 506, diode 503, Zener diode 508, transistor 509, and Darlington transistor 510. Resistor 504 is the internal resistance of diode 503. The components of control circuit 490 are all basic, readily available, inexpensive, electrical parts The following description of the operation of the control system describes operation with a normally healthy battery, operation with large loads for short and long periods, operation when loads drain a battery over a period of time, and the manual reset operation. The description uses examples of battery voltage and Zener diode values that are particularly applicable to a common 12 volt, lead-acid, vehicle battery and electrical system, hut is not meant to limit its use to other voltages, battery types, or applications.

In operation, referring to FIG. 20 with the control system in the closed position, when battery voltage is above 11.5 volts, battery voltage is within the normal range, movable conductor 402 contacts fixed conductor 403, and battery current passes from positive battery post 201, to movable conductor 402, to fixed conductor 403, through terminal adaptor 210, through battery load 340, to ground 202, powering battery load 340. Battery voltage passes from positive battery post 201, to movable conductor 402, to fixed conductor 403, to diode 503, to resistor 504, to junction 505, and quickly charges capacitor 506 until it reaches battery voltage. Resistor 504 limits the amount of current that can pass through it, protecting diode 503 and capacitor 506. Battery voltage at junction 505 causes current to pass through resistor 507, through Zener diode 508, and through the base-emitter path of transistor 509 which causes the collector-emitter path of transistor 505 to have low resistance. The low resistance of the collector-emitter path of transistor 509 causes current to flow from positive battery post 201, to movable conductor 402, to fixed conductor 403, to resistor 560, through the collector-emitter path of transistor 509, to ground 202. The low resistance of the collector-emitter path of transistor 509 to ground 202, causes voltage at junction 561 to be very low, preventing current from flowing through the base-emitter path of Darlington transistor 510. This is the normal operating condition for the battery protection device. The battery has a normal voltage, and is able to power electrical loads. Because resistor 507 and resistor 560 have large values, operating current in the closed position is very small.

When a starting motor is cranked or other large current flows through battery load 340, battery voltage drops quickly at positive battery post 201. The voltage at junction 505 remains at the previous higher value of battery voltage stored in capacitor 506, and capacitor 506 begins discharging stored charge through resistor 507, Zener diode 508, and the base-emitter path of transistor 509, which causes the collector-emitter path of transistor 5439 to have low resistance. The low resistance of the collector-emitter path of transistor 509 causes current to flow from positive battery post 201, to resistor 560, through the collector-emitter path of transistor 509, to ground 202. Diode 503 prevents charge from flowing from capacitor 506, to resistor 504, towards fixed conductor 403. Capacitor 506 stores enough charge to allow large current flows from the battery for a short period of time. If the large current flow through battery load 340 stops, battery voltage at positive battery post 201 returns to a higher value, and capacitor 506 quickly recharges to that higher value. If the large current flow through battery load 340 continues, capacitor 506 loses enough charge to drop its voltage to the breakdown voltage of Zener diode 508, and current cannot flow through Zener diode 508 to the base of transistor 509, and causes the collector-emitter path of transistor 509 to have high resistance. The high resistance of the collector-emitter path of transistor 509 causes current to flow from positive battery post 201, to resistor 560, through the base-emitter path of Darlington transistor 510, to ground 202, causing the collector-emitter path of Darlington transistor 510 to have low resistance. The low resistance of the collector-emitter path of Darlington transistor 510 causes current to flow from positive battery post 201, to movable conductor 402, to fixed conductor 403, through opening coil 443, through the collector-emitter path of Darlington transistor 510, to 9round 202, energizing opening coil 443. Referring to FIG. 21, armature 470 moves to the right against opening solenoid face 441 and movable conductor 402 moves to the right, out of contact with fixed conductor 403, stopping current flow to fixed conductor 403, battery load 340, and the branch circuits of fixed conductor 403. The control system is now in the opened position as shown in FIG. 21. The operation of the control system allows the battery to deliver a large amount of current for short periods of time, for uses such as starting an engine, while preventing power loss from large, constant loads, and preserving the battery's capacity to store power.

The value of capacitor 506 determines the length of time the battery protection device allows before large current loads are switched off.

The control system behaves in a similar way to disconnect smaller loads before a battery is discharged. Referring to FIG. 20 with the control system in the closed position, when small or moderate current is drawn through battery load 340, without properly recharging the battery, the battery slowly loses its stored charge, and battery voltage slowly drops. As battery voltage drops, capacitor 506 loses charge and the voltage at junction 505 is the same as battery voltage. When battery voltage and the voltage at junction 505 drop below the breakdown voltage of Zener diode 508, which is about 11.0 volts, Zener diode 508 blocks current flow through the base-emitter path of transistor 509, causing the collector-emitter path of transistor 509 to have high resistance. The high resistance of the collector-emitter path of transistor 509 causes current to flow from positive battery post 201, to resistor 560, through the base-emitter path of Darlington transistor 510, to ground 202, causing the collector-emitter path of Darlington transistor 510 to have low resistance. The low resistance of the collector-emitter path of Darlington transistor 510 causes current to flow from positive battery post 201, to movable conductor 402, to fixed conductor 403, through opening coil 443, through the collector-emitter path of Darlington transistor 519, to ground 202, energizing opening coil 443. Armature 470 moves to the right against opening solenoid face 441, and the device switches to the opened position, separating movable conductor 402 from fixed conductor 403 and disconnecting positive battery post 201 from battery load 340 and the other branch circuits of fixed conductor 403 as shown in FIG. 21. There is no operating current in the opened position.

When the battery drains are stopped at 11.0 volts, the battery will equalize chemically and battery voltage and power will increase. Substantial cranking power still remains. The circuit is now shown in FIG. 21.

When manual reset button 437 is forced to the left, armature 470 forces movable conductor 402 to latch to the left into contact with fixed conductor 403 and the control system returns to the closed position shown in FIG. 20. The battery is now available for use. Operating current of the control system is very small.

The battery protection device of the third preferred embodiment is reset manually by pushing a button on the switching device. The design has simpler construction with fewer materials and components than the second preferred embodiment, resulting in lower manufacturing cost. Although overdischarge happens to most batteries and results in costly damage and inconvenience, the number of times a battery is overdischarged is often small enough to make the inconvenience of manual resetting in some cases a practical tradeoff in return for lower cost.

The third preferred embodiment provides a battery protection device that prevents discharge of a battery, guarantees cranking, switches power off efficiently with a relatively small amount of energy and current, operates with a relatively small amount of current, and resets, while being a small, conveniently installed accessory, fitting a wide variety of electrical systems, resistant to outside forces and vibration, sealed from the environment, and remaining simple and inexpensive to manufacture.

IV. The Fourth Preferred Embodiment-a battery switch

Figure 23:
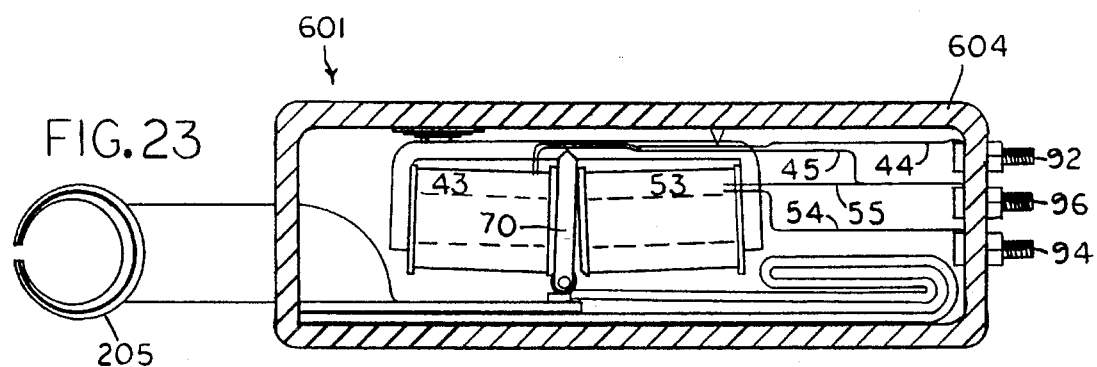
FIG. 23 is a sectional view of FIG. 22 taken along line 23—23.

The fourth preferred embodiment is a battery switch. Referring to FIG. 23, a battery includes a switching device 601 with the same mechanical arrangement and mechanical operation as the second preferred embodiment shown in FIG. 6A but with a different control system.

Referring to FIGS. 23 and 6A, switching device 601 does not include control circuit 190, proximity assembly 180, face wire 185, jumper wire 197, jumper wire 199, cord 195 and clamp 196 of switching device 101. Referring to FIG. 23, opening coil wire 44, opening ground wire 45, closing coil wire 54, and closing ground wire 55 control opening coil 43 and closing coil 53 with the same wiring and control terminal arrangement as switching device 1 of the first preferred embodiment shown in FIG. 2A. Opening coil wire 44 is connected to opening control stud 91 which passes through housing 604 and ends in opening control terminal 92. Closing coil wire 54 is connected to closing control stud 93 which passes through housing 604 and ends in closing control terminal 94. Opening ground wire 45 and closing ground wire 55 are connected to ground stud 95 which passes through housing 604, and ends in ground terminal 96. Studs 91, 93, and 95 are hermetically sealed to housing 604.

Switching device 601 is connected to the battery and positive battery cable with the terminal adaptor 210 shown in FIG. 9, in the same way as already described in the second preferred embodiment. Referring to FIGS. 11, 12, 13, and 23, positive battery clamp 203 is removed from positive battery post 201, terminal 205 is placed on positive battery post 201, terminal adaptor 210 is placed on terminal 205 and tightened with nut 212, and positive battery clamp 203 is fastened to post 217 of terminal adaptor 210. Switching device 601 does not include a ground clamp 196, and no connection to the negative battery clamp 204 is necessary.

Figure 24:
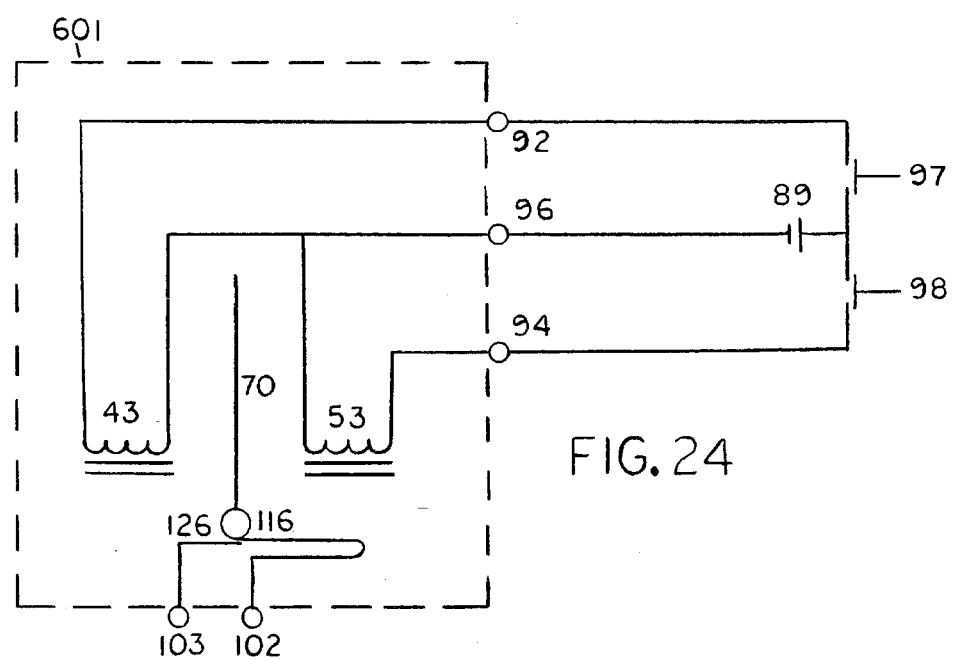
FIG. 24 is a schematic drawing of a control circuit for the fourth preferred embodiment.

Switching device 601 is controlled by the control system shown in FIG. 24. The circuit and its operation are the same as described for the first preferred embodiment, as shown in FIG. 4. Referring to FIG. 24, when momentary switch 97 is closed briefly, voltage source 89 is connected briefly between opening control terminal 92 and ground terminal 96, energizing opening coil 43, and causing armature 70 to move to the left off movable contact 116. Movable contact 116 moves upward and out of contact with fixed contact 124, breaking the pathway between movable conductor 102 and fixed conductor 103, and interrupting battery power to positive battery clamp 203 and any battery load. When momentary switch 98 is closed briefly, voltage source 89 is connected briefly between closing control terminal 94 and ground terminal 96, energizing closing coil 53, and causing armature 70 to move to the right, onto movable contact 116. Movable contact 116 moves downward into contact with fixed contact 124, making a pathway between movable conductor 102 and fixed conductor 103, allowing power to flow from the positive battery post 201 to positive battery clamp 203, and supplying power to any electrical circuits.

The battery itself may be used as voltage source 89. With this arrangement, power from the battery can be controlled by two momentary switches. The momentary switches may be placed at a distance, allowing the power to be controlled remotely.

The fourth preferred embodiment provides a battery switch that fits conveniently on top of the battery, out of the way of nearby equipment, is easily added or removed as an accessory to an electrical system, allows a range of connections to adapt to most physical layouts, is sealed from the environment, controls all of a battery's power, requires very little power for switching, latches requiring no holding current, is resistant to outside forces and vibration, and is relatively simple in design and inexpensive to manufacture.

V. The Fifth Preferred Embodiment-a long-life battery

In the fifth preferred embodiment a battery protection device that prevents discharge is incorporated in the manufacture of a battery to provide a long-life battery.

Figure 25:
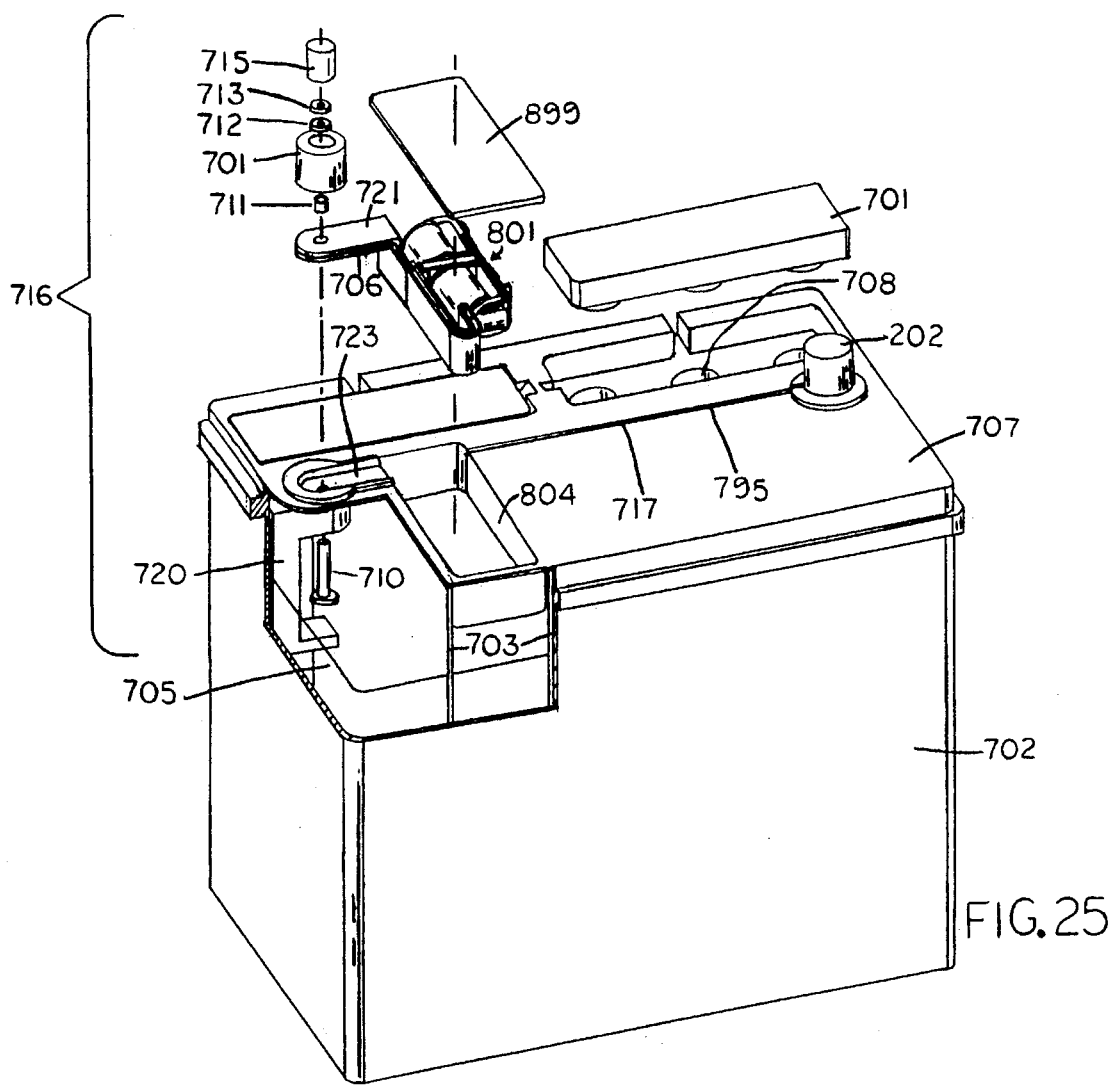
FIG. 25 is a perspective, exploded view of the fifth preferred embodiment with a portion of the battery case and top cover removed.

Referring to FIG. 25, a battery has the components of an ordinary battery including a battery case 702, partitions 703, electrolytic solution 705, positive post strap 720, negative battery post 202, vents 708, and vent plugs 709. The battery has a novel top cover 707 which includes an indented cavity 804, a switching device 801, an upper conductor 721, a lower conductor 706, a positive post 701, a rivet 710, an insulating sleeve 711, an insulating washer 712, a hard washer 713, sealer 715, slot 723, slot 717, ground wire 795, and cavity lid 899.

Figure 26:
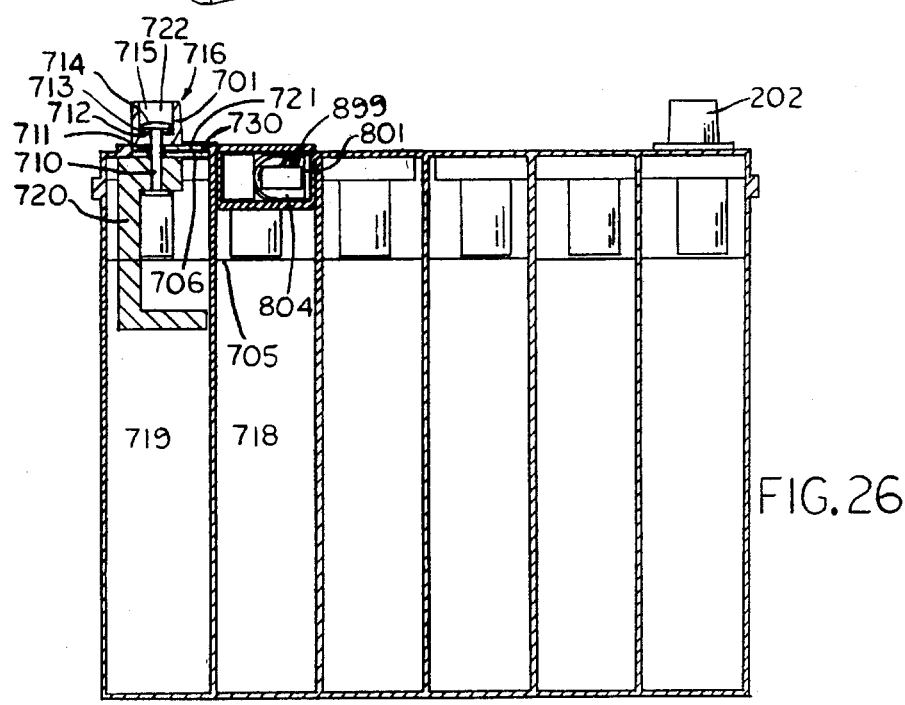
FIG. 26 is a sectional view of FIG. 27 along lines 26—26.
Figure 27:
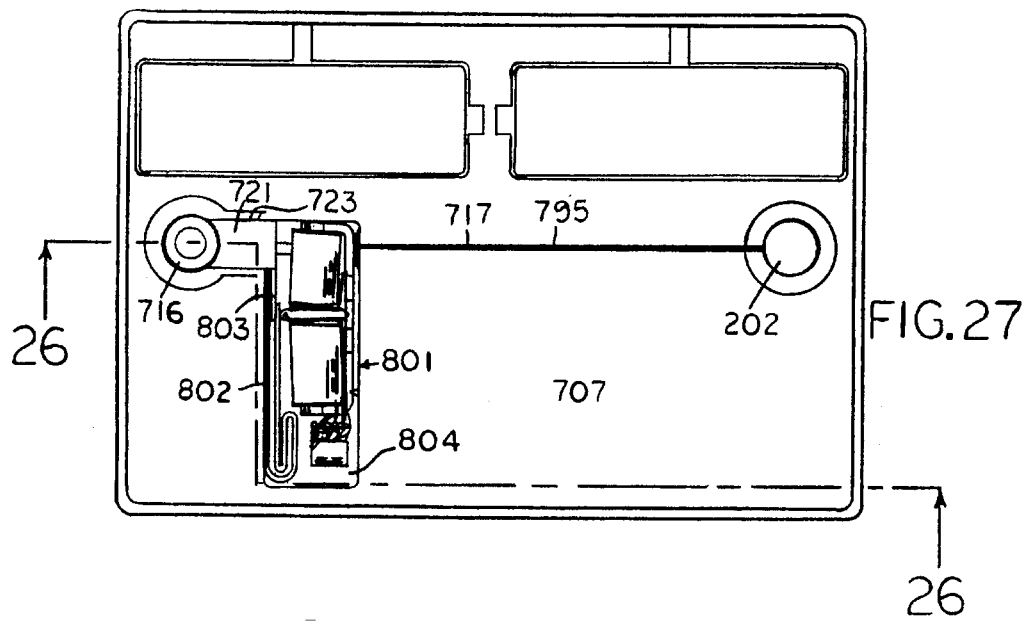
FIG. 27 is an assembled, top plan view of FIG. 25 with the cavity lid removed.

Referring to FIG. 26, metal rivet 710, also referred to as a fastener, sandwiches post assembly 716 together tightly and includes positive post strap 720, lower conductor 706, insulator 730, upper conductor 721, insulating sleeve 711, positive post 701, insulating washer 712, hard washer 713, and terminates in the pressed end 714 of rivet 710. Rivet 710 is coated with a covering resistant to electrolytic solution 705. Insulator 720 separates and provides electrical isolation between upper conductor 721 and lower conductor 706. Rivet 710 is electrically isolated from upper conductor 721 and positive post 701 with insulating sleeve 711 and insulating washer 712. Cavity 722 in positive post 701 is filled with a nonconducting sealer 715 to seal the top of positive post 701 and strengthen it against mechanical abuse. Cavity 804 fits between the two partitions of the cell 718 adjacent to the positive strap cell 719, and is shallow enough to lay above the surface level of electrolytic solution 705, allowing a normal level of the electrolytic solution. Switching device 801 fits in cavity 804 with upper conductor 721, insulator 730, and lower conductor 706 fitting in slot 723, as shown in FIGS. 25 and 26. Referring to FIG. 27, ground wire 795 runs from cavity 804 though ground wire slot 717 on the top of cover 707, and connects to negative battery post 202. Slot 717 and the upper surface of upper conductor 721 in slot 723 are sealed on top from the elements. Referring to FIG. 26, lid 899 hermetically seals the opening of cavity 804. The arrangement of switching device 801 in cavity 804, sealed with lid 899, guarantees the separation of switching device 801 from the battery interior and protects it from both the inside and outside battery environments, while allowing the physical configuration of a conventional battery.

Referring to FIG. 27, the components of switching device 801 are identical to the components of switching device 101 of the second preferred embodiment shown in FIG. 2A, with the exception of the length of movable conductor 802 within cavity 804, the shape of movable conductor 802 and fixed conductor 803 where they make a 90° bend and go to post assembly 716, the exchange of ground wire 795 for cord 195 and clamp 196, and the use of cavity 804 as part of the housing. The shape of movable conductor 802 within cavity 804 allows movable conductor 802 to act like a cantilever spring with reduced stiffness to force while remaining small and fitting the dimensions of cavity 804. Referring to FIG. 26, the connection of lower conductor 706 to positive post strap 720 and upper conductor 721 to positive post 701 eliminates the need for terminal adaptor 210 shown in FIG. 9. Switching device 801 is substantially the same as switching device 101 of the second preferred embodiment and has the same advantages of efficiently switching power on and off with a relatively small amount of energy and current. It also latches without holding current and is resistant to outside forces and vibration.

Switching device 801 includes a control system identical to the control system of the second preferred embodiment shown in FIGS. 6A and 15, and with the same operation.

In operation, referring to FIG. 26, when the battery has a normal voltage electricity flows from positive post strap 720, to lower conductor 706, to switching device 801 in cavity 804, to upper conductor 721, to positive post 701, to any connected battery loads, to negative battery post 202. When there is a large current drain on the battery, as when a starter motor is cranked, battery voltage drops and the control system allows the load for a short period of time. If the large current drain doesn't stop or a smaller current drain lowers the voltage of the battery, switching device 801 automatically breaks the path between movable conductor 802 and fixed conductor 803 in FIG. 27, interrupting the path for current from positive post strap 720 to positive post 701, switching battery power off, stopping the loss of power, and preserving the battery. When battery power is turned off, the battery equalizes chemically, increases in voltage, and recovers its ability to deliver substantial power. The battery remains off until the damaging loads are removed, then automatically resets, allowing reuse. Operating current of the control system is very small.

The device provides a long life battery by preventing overdischarge of the battery to low voltage levels that reduce the storage ability of the battery and shorten its life. Overdischarge is prevented with a switching device and control system which automatically switches power off at low voltage levels and switches power back on only when damaging loads have been removed.

The fifth preferred embodiment provides a long-life battery that automatically protects itself from overdischarge, guarantees cranking, and operates efficiently, while remaining simple and inexpensive to manufacture.

VI. The Sixth Preferred Embodiment-a long-life battery with manual reset

In sixth preferred embodiment a battery protection device that prevents discharge and is manually resetting is incorporated in the manufacture of a battery to provide a long-life battery that is less expensive to manufacture.

Figure 28:
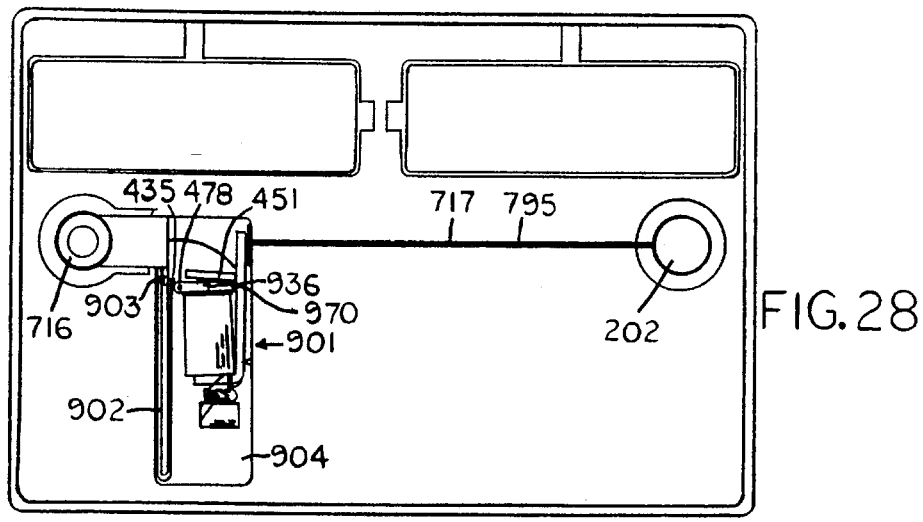
FIG. 28 is a top plan view of the sixth preferred embodiment with the cavity lid removed.

A long-life battery is provided identical to the fifth preferred embodiment with the exception that the switching device 801 shown in FIG. 27 of the fifth preferred embodiment is exchanged with the switching device 901 shown in FIG. 28. Switching device 901 in FIG. 28 is substantially the same as switching device 401 already discussed in the third preferred embodiment and shown in FIG. 18A. The third preferred embodiment provided a battery protection device with a manual reset that was simpler and less expensive to manufacture.

Referring to FIGS. 28, 26 and 27, the sixth preferred embodiment has the same components and construction as the fifth preferred embodiment with the exception of the exchange of switching device 901 for switching device 801. The components outside of cavity 904 are the same and are constructed the same as the fifth preferred embodiment already described.

Figure 29:
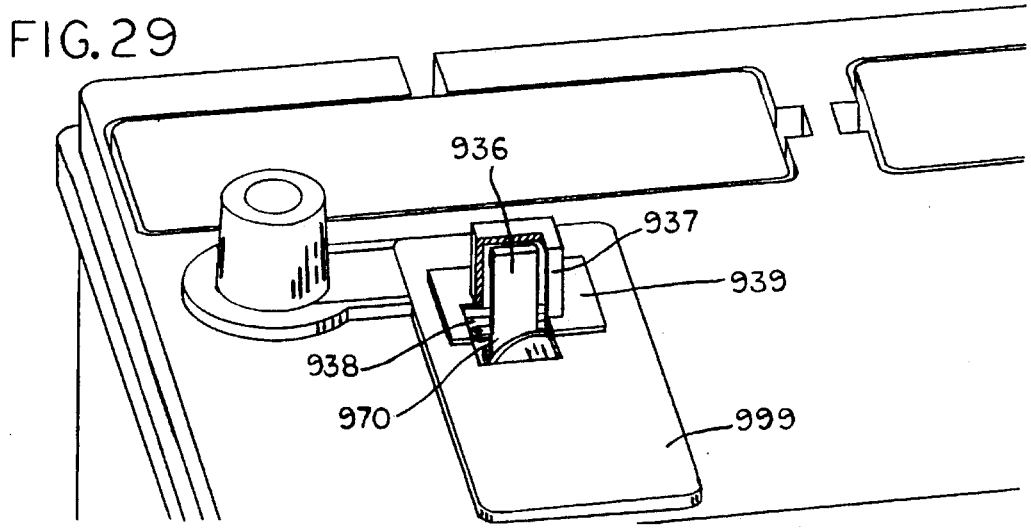
FIG. 29 is a fragmentary, exposed, perspective view of the reset mechanism of the sixth preferred embodiment.

Referring to FIGS. 28 and 18A, the components of switching device 901 are identical to the components of switching device 401 of the third preferred embodiment with the exception of a slight difference in the length of movable conductor 902 within cavity 904, the shape of movable conductor 902 and fixed conductor 903 where they make a 90° bend and go to the post assembly 716, the exchange of ground wire 795 for cord 195 and clamp 196, the use of cavity 904 as part of the housing, and a different resetting mechanism. Referring to FIGS. 18A, 29 and 28, lid 999 hermetically seals cavity 904. Reset rod 436, reset button 437, passage 438, and membrane 439 are replaced with reset ear 936 of armature 970, passage 938 in lid 999, and membrane 939. Reset ear 936 passes through passage 938 in lid 999. Elastic membrane 939 seals passage 938 while remaining flexible. The arrangement of switching device 901 in cavity 904, sealed with lid 999 and membrane 939 guarantees the separation of switching device 901 from the battery interior and protects it from both the inside and outside battery environment, while substantially allowing the physical configuration of a conventional battery.

Referring to FIGS. 29 and 28, when a manual force is applied into face 937 of membrane 939, the force is transmitted to ear 936, forcing armature 970 to pivot toward stop block 451, forcing roller 478 onto small block 435, forcing movable conductor 902 into forcible contact with fixed conductor 903, and latching armature 970 with a biasing force against stop block 451.

Switching device 901 is substantially the same as switching device 401 of the third preferred embodiment and has the same advantages of efficiently switching power off with a relatively small amount of energy and current. It latches in the closed or opened position without holding current and is resistant to outside forces and vibration.

Switching device 901 includes a control system identical to the control system of the third preferred embodiment shown in FIGS. 18A and 20 and with the same operation.

In operation, referring to FIG. 26 and 28, when the battery has normal voltage, electricity flows from positive post strap 720, to lower conductor 706, to switching device 901 in cavity 904, to upper conductor 721 to positive post 701, to any connected battery loads, to negative battery post 202. When there is a large current drain on the battery, as when a starter motor is cranked, battery voltage drops and the control system allows the load for a short period of time. If the large current drain doesn't stop or a smaller current drain lowers the voltage of the battery, switching device 901 automatically breaks the path between movable conductor 902 and fixed conductor 903, interrupting the path for current from positive post strap 720 to positive post 701, switching battery power off, stopping the loss of power, and preserving the battery. When battery power is turned off, the battery equalizes chemically, increases in voltage, and recovers its ability to deliver substantial power. The battery remains off until membrane 939 is pushed at face 937 in FIG. 29, resetting switching device 901 to the closed position, and allowing reuse. Operating current of the control system is very small.

The device provides a long life battery by preventing overdischarge of the battery to low voltage levels that reduce the storage ability of the battery and Shorten its life. Overdischarge is prevented with a switching device and control system which automatically switches power off at low voltage levels.

The design of the sixth preferred embodiment has simpler construction with fewer components and materials than the fifth preferred embodiment, resulting in lower manufacturing cost. Although overdischarge happens to most batteries and results in costly damage and inconvenience, the number of times a battery is overdischarged is small enough to make the inconvenience of manual resetting in some cases a practical tradeoff in return for lower cost.

The sixth preferred embodiment provides a long-life battery that automatically protects itself from overdischarge, guarantees cranking, and operates efficiently, while remaining simple and inexpensive to manufacture.

Although the invention is described with respect to the preferred embodiments, modifications thereto will be apparent to those skilled in the art. Therefore, the scope of the invention is to be determined by reference to the claims which follow.

I claim:

1. A circuit breaker for switching an external electrical circuit means having a current path comprising:

a frame;

an armature mounted relative to said frame and having an edge, said armature being movable for moving said edge between a first position and a second position spaced from said first position;

first means selectively operable for moving said armature edge from said first position to said second position;

a pair of electrical circuit contacts mounted adjacent to said edge of said armature and connectable to the external electrical circuit, said pair of contacts including a fixed-position contact and a movable contact, said movable contact being movable between contacting and noncontacting positions for opening and closing the external current path;

roller means having a radius of curvature is mounted on said armature edge;

means defining a roll surface for said roller means to roll along when said armature edge moves between said first and second positions, said roll surface including a movable surface that moves relative to said fixed-position contact a distance less than the radius of said roller means as said roller means rolls along said roll surface, with said contacts moving between said contacting position and said noncontacting position when said roller means rolls relative to said movable surface.

2. A circuit breaker according to claim 1 wherein said armature pivots relative to said frame about a pivot axis as said armature moves between said first and second positions, and said roller means and said contacts are in radial alignment when said movable contact is in said contacting position.

3. A circuit breaker according to claim 2 further comprising means for resiliently biasing said roller means toward said contacts, whereby said roller means is movable in a direction transverse to said surface during movement of said roller means along said surface.

4. A circuit breaker according to claim 1 further comprising means for biasing said movable contact toward said roller means with said roller means acting against the bias on said movable contact during movement of said roller means along said movable surface.

5. A circuit breaker according to claim 4 wherein said biasing means comprises a shape-memory conductor connected to said movable contact.

6. A circuit breaker according to claim 1 wherein said armature edge has a center position between said first and second armature positions at which there is a maximum bias on said roller means and said armature latches in said first and second positions.

7. A circuit breaker according to claim 1 wherein the external electrical circuit means has a battery with a generally uniform surface and at least one terminal post extending outwardly from the surface, said circuit breaker further comprising a housing for containing said frame, said armature, said pivoting means, said contacts, said roller means, said moving means, said surface-defining means, and said biasing means, said housing having a dimension normal to the battery surface corresponding to the height of the one terminal post.

8. A circuit breaker according to claim 7 where said terminal post extends with a known shape outwardly from a surface of the battery, said circuit breaker further comprising a terminal adapter means having an electrically conductive inner collar electrically connected to one of said contacts and adapted to be intimately received on the terminal post, an electrically conductive outer collar generally surrounding said inner collar and electrically connected to the other of said contacts, and means for insulating said inner collar from said outer collar, said contacts thereby being positioned electrically between said inner collar and said outer collar.

9. A circuit breaker according to claim 8 wherein said adapter means further comprises a substitute terminal post adapted to have a shape corresponding to the shape of the battery terminal post and means for electrically connecting and supporting said substitute terminal post relative to said outer collar.

10. A circuit breaker according to claim 9 wherein said connecting and supporting means of said substitute terminal post relative to said outer collar comprises a manually adjustable clamp configured to receive and conform to said exposed surface of said outer collar.

11. A circuit breaker according to claim 1 where the external electrical circuit means has first and second terminals of different voltage, said circuit breaker further comprising control circuit means responsive to the voltage differential between the first and second terminals for selectively operating said moving means.

12. A circuit breaker according to claim 11 wherein said control circuit means comprises means for sensing the voltage differential between the first and second terminals and operating said moving means when the sensed voltage is below a first selected voltage.

13. A circuit breaker according to claim 12 wherein said control circuit means further comprises means for delaying the operation of said moving means to a time after the time the voltage is sensed to be below the selected voltage.

14. A circuit breaker according to claim 13 wherein said delaying means delays the operation of said moving means by an amount of delay that increases with increasing rate of drop of voltage between the first and second terminals past the selected voltage.

15. A circuit breaker according to claim 11 further comprising second means selectively operable for moving said armature from the second position toward the first position, and wherein said control circuit means includes means for sensing whether a load greater than a selected minimum load exists in the external circuit and operates said second moving means when the voltage differential is greater than a second selected voltage and a load that is not greater than the selected minimum load exists in the external circuit.

16. A circuit breaker according to claim 11 wherein said control circuit means further comprises means for sensing when said armature is in the second position and ceasing to operate said moving means when said armature is in the second position.

17. A circuit breaker for selectively disconnecting a battery having terminals providing a voltage differential from and reconnecting the battery to an external electrical circuit having a current path comprising:

a frame;

first and second coaxial and spaced-apart solenoids mounted relative to said frame and selectively and independently operable for generating a magnetic field between said first and second solenoids;

an armature extending between said first and second solenoids, having a pivot end for pivoting relative to said frame between a first position adjacent to said first solenoid and a second position adjacent to said second solenoid in response to the respective operation of said first and second solenoids, said armature also having a roller end opposite from said pivot end;

first and second electrical conductors connectable to the external current path, said conductors terminating in respective first and second contacts adjacent to said roller end of said armature, said first contact being movable relative to said second contact between contacting and noncontacting positions for opening and closing the external current path, said first conductor having a surface facing said roller end of said armature, having shape memory and being biased relative to said second contact;

a roller means mounted on said armature roller end for moving with said roller end and rolling along a length of said first conductor surface and being positioned for moving said first conductor against the bias of said first conductor, whereby said first contact is in the contacting position when said armature is in the first position and in the noncontacting position when said armature is in the second position;

means for resiliently biasing said roller means toward said contacts with said armature having a center position between the first and second positions at which there is a maximum bias on said roller means and said armature is self-latching in the first and second positions; and control circuit means responsive to the voltage differential between the battery terminals for selectively operating said first and second solenoids for moving said armature selectively between the first and second positions, said control circuit means comprising means for sensing the voltage differential between the first and second terminals and operating said second solenoid when said armature is in the first position and the sensed voltage is below a first selected voltage, and operating said first solenoid when said armature is in the second position and the sensed voltage is above a second selected voltage, said control circuit means further comprising means for delaying the operation of said second solenoid to a time after the time the sensed voltage is below the first selected voltage, and means for sensing when said armature has moved to a respective one of the first and second positions while said respective one of said first and second solenoids is operating and ceasing operation of said one solenoid when said armature is in the one position.

18. A circuit breaker according to claim 17 wherein said control circuit means further includes means for sensing whether a load greater than a minimum, nonzero load exists in the external circuit while said armature is in the second position and operates said first solenoid only when a load that is not greater than the minimum load exists in the external circuit.

19. A circuit breaker according to claim 1 wherein said external electrical circuit comprises an electrolytic battery including a housing having a plurality of planar faces, at least one electrolytic cell defined by associated walls and containing an electrolytic solution, oppositely spaced positive and negative electrodes extending into said electrolytic solution, and associated respective positive and negative terminal posts extending from a face of said housing; said battery further being characterized by:

a cavity formed in said housing and extending inwardly of a face of said housing between a pair of adjacent cell walls;

a lid sealingly placeable over said cavity to form a continuation of said face in which said cavity is formed, said circuit breaker mounted in said cavity for connecting one of said terminal posts to the associated one of said electrodes, and for disconnecting said one terminal post from said one electrode when the voltage between the positive and negative electrodes is less than a selected voltage; and means for connecting said circuit breaker between said one terminal post and said one electrode.

20. A circuit breaker according to claim 19 wherein said connecting means between said circuit breaker, said one of said terminal posts, and said associated electrode comprises:

a first planar conductor connected to said circuit breaker;

a second planar conductor connected to said circuit breaker;

an electrically insulating membrane; and fastener means for securing together in an ordered assembly said one terminal post, said first conductor, said membrane, said second conductor, and said one electrode, with said one terminal post and said first conductor electrically connected, with said second conductor and said one electrode electrically connected, and with said first and second conductors electrically isolated.

21. A circuit breaker according to claim 19 wherein said first means for moving said armature is a solenoid operable for generating a magnetic field which attracts said armature toward said solenoid, said solenoid mounted adjacent to said second position of said armature, said circuit breaker further comprising:

a control circuit means responsive to the voltage differential between the battery electrodes for selectively operating said first solenoid for moving said armature between the said first and said second positions, said control circuit means comprising means for sensing the voltage differential between said first and second electrodes and operating said solenoid when said armature is in the first position and the sensed voltage is below a first selected voltage, said control circuit means further comprising means for delaying the operation of said solenoid to a time after the time the sensed voltage is below the first selected voltage.

22. A circuit breaker according to claim 19 wherein said housing has a top face and said cavity is formed in said top face above the level of electrolytic solution.

* * * * *